(12) United States Patent
Spearin et al.

(10) Patent No.: US 8,545,658 B2
(45) Date of Patent: Oct. 1, 2013

(54) APPARATUS AND METHODS FOR FORMING FILTER SLEEVES HAVING CIRCUMFERENTIAL PLEATS FOR USE IN A BAG-TYPE FILTER ASSEMBLY

(75) Inventors: Aaron Spearin, Colchester, CT (US); Craig Spisinski, North Branford, CT (US); Mahesh Z. Patel, Plantsville, CT (US); Keith Wesner, East Hampton, CT (US); Jack H. Vining, Jr., Bolton, CT (US); James Beausoleil, East Lyme, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1610 days.

(21) Appl. No.: 11/557,626

(22) Filed: Nov. 8, 2006

(65) Prior Publication Data
US 2007/0102101 A1    May 10, 2007

Related U.S. Application Data

(60) Provisional application No. 60/736,071, filed on Nov. 9, 2005.

(51) Int. Cl.
*B29C 53/04* (2006.01)
(52) U.S. Cl.
USPC ........... 156/204; 156/205; 156/207; 156/208; 156/227
(58) Field of Classification Search
USPC .............................. 156/209; 210/493.1–493.5
See application file for complete search history.

(56) References Cited

U.S. PATENT DOCUMENTS

| | | | |
|---|---|---|---|
| 624,014 A | 5/1899 | Hagerty |
| 1,647,799 A | 11/1927 | Hammer |
| 1,809,716 A | 6/1931 | McDonough |
| 1,846,584 A | 2/1932 | Clark |
| 2,323,896 A | 7/1943 | Cahill |
| 2,387,368 A | 10/1945 | Vokes |
| 2,395,449 A | 2/1946 | Briggs |
| 2,420,414 A | 5/1947 | Briggs |

(Continued)

FOREIGN PATENT DOCUMENTS

| DE | 1118758 | 12/1961 |
|---|---|---|
| DE | 39 05 854 | 9/1990 |

(Continued)

OTHER PUBLICATIONS

PCT Search Report for PCT/US2008/086923, mailed Jun. 18, 2009.

(Continued)

*Primary Examiner* — Christopher Schatz
(74) *Attorney, Agent, or Firm* — Scott A. Baum

(57) ABSTRACT

Systems are provided for fabricating a plurality of possible pleat packs used in the formation of circumferentially pleated filter sleeves comprising a substantially horizontal contact surface, a pleating machine having cutting structure, operatively positioned proximate the substantially horizontal contact plane, for delivering continuous upstanding pleat packs of a predetermined pleat formation to the horizontal contact surface, structure for guiding the upstanding pleat packs received from the pleating machine into a flattened condition, structure for securing the pleat packs in the flattened condition and structure for forming the flattened pleat packs into a predetermined length for subsequent formation into sleeves of circumferential pleats. Methods for fabricating a plurality of possible pleat packs used in the formation of circumferentially pleated filter sleeves are also provided.

9 Claims, 18 Drawing Sheets

(56) References Cited

U.S. PATENT DOCUMENTS

| | | |
|---|---|---|
| 2,448,157 A | 8/1948 | Schneider |
| 2,586,078 A | 2/1952 | O'Malley |
| 2,689,652 A | 9/1954 | Gretzinger |
| 2,758,760 A | 8/1956 | Bock et al. |
| 2,792,118 A | 5/1957 | Kraissl, Jr. |
| 2,801,009 A | 7/1957 | Bowers |
| 2,840,283 A | 6/1958 | Roussos |
| 2,979,240 A | 4/1961 | Liebeskind |
| 3,042,571 A * | 7/1962 | Jackson ............ 156/191 |
| 3,106,528 A | 10/1963 | Burks |
| 3,306,794 A * | 2/1967 | Humbert, Jr. ............ 156/69 |
| 3,349,159 A | 10/1967 | Luboshez |
| 3,390,218 A | 6/1968 | Painter et al. |
| 3,474,599 A | 10/1969 | Schwab |
| 3,542,636 A * | 11/1970 | Wandel ............ 428/178 |
| 3,701,433 A | 10/1972 | Krakauer et al. |
| 3,733,267 A | 5/1973 | Haase |
| 3,988,244 A | 10/1976 | Brooks |
| 4,081,379 A | 3/1978 | Smith |
| 4,086,116 A * | 4/1978 | Yazaki et al. ............ 156/205 |
| 4,377,431 A | 3/1983 | Chodosh |
| 4,422,939 A | 12/1983 | Sharp et al. |
| 4,465,213 A | 8/1984 | Lehmann et al. |
| 4,552,661 A | 11/1985 | Morgan |
| 4,680,118 A | 7/1987 | Taga |
| 4,828,698 A | 5/1989 | Jewell et al. |
| 4,863,602 A | 9/1989 | Johnson |
| 4,877,526 A | 10/1989 | Johnson et al. |
| 5,075,004 A | 12/1991 | Gershenson et al. |
| 5,174,896 A | 12/1992 | Harms, II |
| 5,211,091 A | 5/1993 | Cole |
| 5,252,207 A | 10/1993 | Miller et al. |
| 5,275,743 A | 1/1994 | Miller et al. |
| 5,342,511 A | 8/1994 | Brown et al. |
| 5,472,606 A | 12/1995 | Steere et al. |
| RE35,241 E | 5/1996 | Capy et al. |
| 5,543,047 A | 8/1996 | Stoyell et al. |
| 5,702,037 A | 12/1997 | Merkel |
| 5,709,771 A * | 1/1998 | Fritzman ............ 156/474 |
| 5,814,219 A * | 9/1998 | Friedmann et al. ...... 210/493.3 |
| 5,840,188 A | 11/1998 | Kirsgalvis |
| 5,882,288 A | 3/1999 | Paul et al. |
| 6,030,531 A | 2/2000 | Gershenson |
| 6,048,298 A | 4/2000 | Paul et al. |
| 6,113,784 A | 9/2000 | Stoyell et al. |
| 6,238,560 B1 | 5/2001 | Gershenson |
| 6,315,130 B1 | 11/2001 | Olsen |
| 6,409,919 B1 | 6/2002 | Tara |
| 6,428,594 B1 | 8/2002 | Hintenlang et al. |
| 6,511,598 B2 | 1/2003 | Gershenson |
| 6,585,892 B2 | 7/2003 | Gershenson |
| 6,585,893 B2 | 7/2003 | Gershenson |
| 6,626,299 B1 | 9/2003 | Brown et al. |
| 6,706,198 B2 | 3/2004 | Gershenson |
| 6,712,967 B2 | 3/2004 | Gershenson |
| 6,780,217 B1 | 8/2004 | Palmer |
| 6,871,480 B1 | 3/2005 | Goodrich |
| 6,872,309 B2 | 3/2005 | Pearson et al. |
| 7,922,006 B2 | 4/2011 | Fall et al. |
| 2004/0075221 A1 | 4/2004 | Gershenson et al. |
| 2005/0061723 A1 | 3/2005 | Matsushita |
| 2006/0108277 A1 | 5/2006 | Fall et al. |
| 2007/0007218 A1* | 1/2007 | Hundley et al. ............ 210/748 |
| 2007/0084786 A1* | 4/2007 | Smithies ............ 210/490 |
| 2011/0152054 A1 | 6/2011 | Fall et al. |

FOREIGN PATENT DOCUMENTS

| | | |
|---|---|---|
| EP | 0516846 | 12/1992 |
| EP | 0 667 800 | 7/2000 |
| GB | 823648 | 11/1959 |
| GB | 1400147 | 7/1975 |
| GB | 1517731 | 7/1978 |
| GB | 2176416 | 12/1986 |
| JP | 60-125220 | 7/1985 |
| SU | 176120 | 9/1992 |
| WO | WO 94/11082 | 5/1994 |
| WO | WO 9411082 | 5/1994 |
| WO | WO 00/40319 | 7/2000 |
| WO | WO 01/21279 | 3/2001 |
| WO | WO 01/21279 A1 | 3/2001 |
| WO | WO 2006/055710 | 5/2006 |
| WO | WO 2009/085726 | 7/2009 |

OTHER PUBLICATIONS

International Search Report for PCT/US2006/043776, mailed Apr. 6, 2007.

PCT Search Report for PCT/US2005/041682, mailed Jun. 14, 2006.

Extended Search Report for European Appl. No. 08867451.0, Apr. 5, 2011.

Extended Search Report for European Appl. No. 06837315.8, Dec. 10, 2009.

* cited by examiner

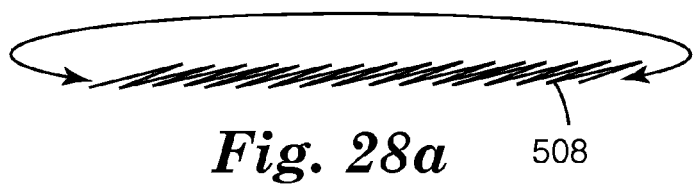
Fig. 28a
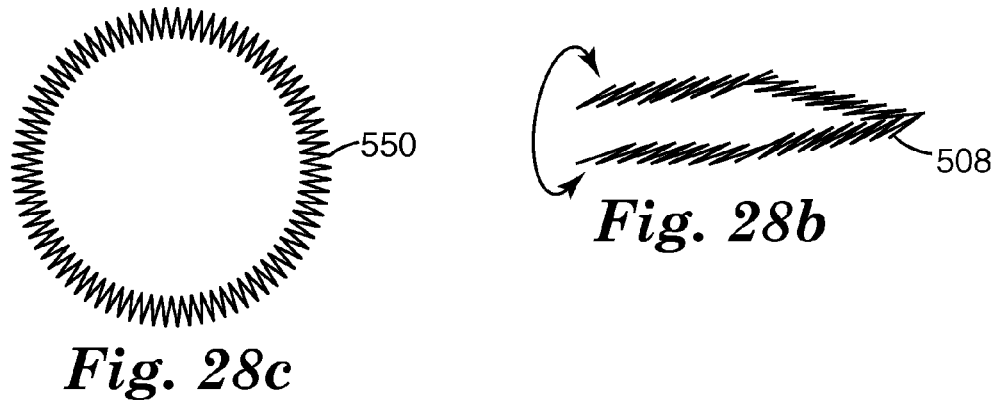
Fig. 28b
Fig. 28c
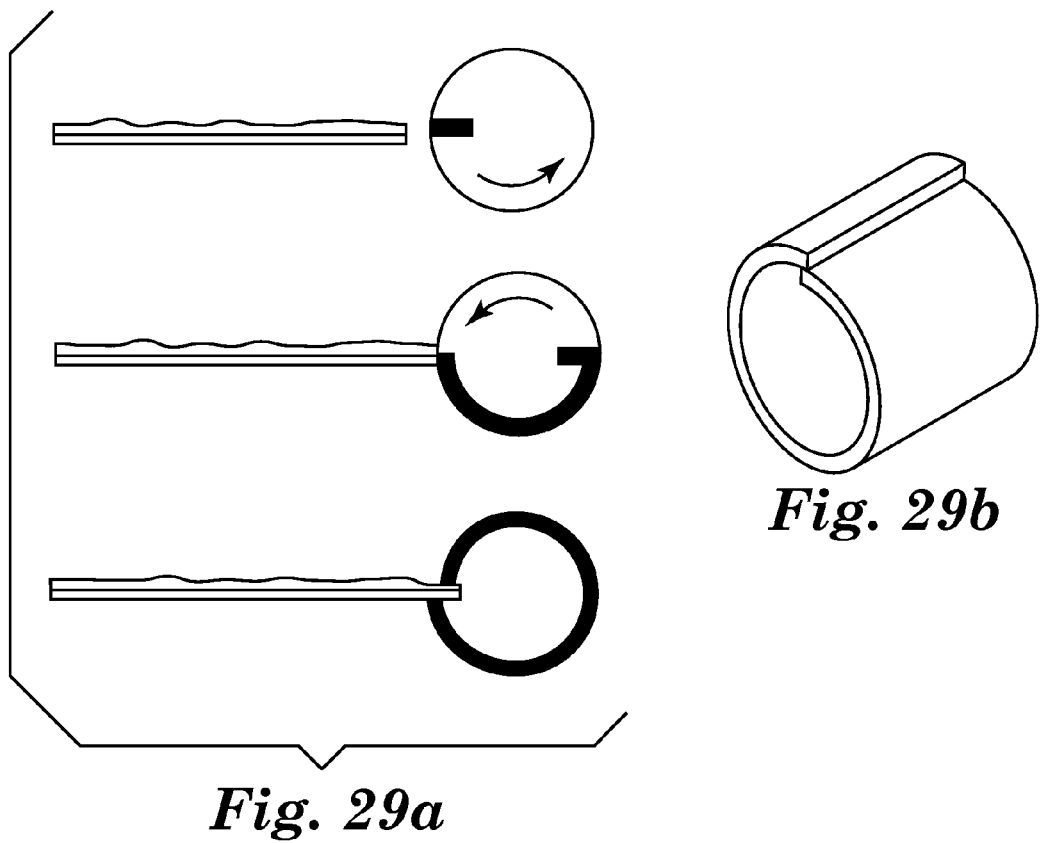
Fig. 29a
Fig. 29b

APPARATUS AND METHODS FOR FORMING FILTER SLEEVES HAVING CIRCUMFERENTIAL PLEATS FOR USE IN A BAG-TYPE FILTER ASSEMBLY

RELATED APPLICATION

This application is a continuation-in-part and claims priority to commonly owned U.S. Provisional Patent Application Ser. No. 60/736,071, filed Nov. 9, 2005, of Aaron Spearin et al., entitled "Apparatus and Methods for Forming Filter Sleeves Having Circumferential Pleats For Use in a Bag-Type Filter Assembly," the disclosure of which is herein incorporated by reference to the extent not inconsistent with the present disclosure.

BACKGROUND

The subject disclosure is directed to fluid filtration, and particularly, to a bag-type filter assembly having two concentric circumferentially pleated media sleeves defining an annular passage therebetween, which receives fluid for filtration, and more particularly to apparatus and methods for forming filter sleeves having circumferential pleats.

Bag-type filter systems for fluid filtration are well known in the art. These systems typically include a cylindrical housing, which is closed at one end and has a removable cover at the opposed end. An inlet conduit delivers fluid to be filtered into the housing and an outlet conduit removes filtered fluid from the housing.

Replaceable bag filters are disposed within the housing in order to filter fluids delivered thereto. Typically, bag filters include filter media having an open upper end and a closed bottom. The filter bag is supported within an open mesh basket or cage, which is typically suspended within the housing. The basket is intended to support the media of the filter bag to prevent it from bursting as the bag fills with liquid.

There have been a number of efforts to design pleated filters and machines for fabricating the same. For example, U.S. Pat. No. 5,543,047 to Stoyell et al. (hereinafter Stoyell et al.) describes filter elements employing an over-laid pleat or angled pleat media configuration and methods to produce said configuration. Stoyell et al. describe a pusher-bar pleating method, creating a slanted pleat wherein "the two legs of each pleat have differing heights prior to being formed into a laid-over state". During the Stoyell et al. process, flexible media sits flat upon a horizontal surface while a pusher bar exerts a vertical pressure on the media while also moving in the forward direction. The flexible media "balloons" off the horizontal surface in a predictable manner while the pusher bar continues to push the media beneath a stationary pressure plate where heat and pressure set the pleat. An additional blade is engaged behind each pleat to prevent blowback of the pleat pack. An optional feature is described wherein a third knife is stationed beneath the horizontal surface and advances upward beneath the media to better encourage the media to "balloon" during forward movement of the pusher bar. Each new pleat is predictably creased as the new pleat is pressed between the face of the pusher bar and previously pleated material under the pressure plate.

Entire pleat packs are advanced beneath the pressure plate one pleat at a time with each forward advancement of the pusher bar. The pleat formation is governed by the face angle of the pusher bar, the travel distance of the pusher bar and relative positions and angles of the other tools and fixtures. The resulting pleat pattern is described as arcuate or slanted pleats in intimate contact at an angle between 15° and 75° relative to the tangent of the circumference of the cartridge core. In one embodiment, the pleat orientation is maintained by a strip of webbing adhered and spirally wrapped around the circumference and extending the entire length of the element. The spiral wrap is spaced so as not to impede flow.

A filter manufactured in accordance with the Stoyell et al. patents is manufactured by Pall Corporation of East Hills, N.Y., and sold under the tradename Ultipleat.® One version of this product is the Ultipleat® High Flow filter, which is manufactured in several different sizes. For example, the filter is manufactured in 6 inch, single open-ended configuration with a 20 inch, 40 inch or 60 inch height. The Pall Ultipleat® filter is also available as a standard 10 inch cartridge with a 2.5 inch diameter. In this format, several 10 inch cartridges may be stacked together for certain applications.

For another example, U.S. Pat. No. 5,174,896 to Harms, II (hereinafter Harms, II) describes a method of forming a slanted pleat pattern, resulting in a pleat style similar to that described in Stoyell et al. Harms, II, however utilizes driven rollers and one roller with a scoring means. Flat media is pulled between a driven rubber impact roller and a pleater roller fitted with scoring wires under controlled pressure. The scoring wires in conjunction with the impact roller exert a more concentrated force on the media in a controlled location. The result is a weakened or compressed zone traversing the width of the media roll. A second set of rollers push the scored media forward against what is described as an advancement barrier, which encourages the media to buckle and fold along the scored compressed zones. The pleat formation is governed by the spacing of the scoring wires on the pleater roller. A pattern of alternating short and long distances between scoring wires will result in a pleat with one leg longer than the other, generating the slanted pleat orientation.

For still another example, U.S. Pat. No. 2,395,449 to Briggs (hereinafter Briggs) describes a filter element with pleats in close contact and arcuate or angled in nature contained by a binding strip. Briggs describes a method of maintaining pleats of a filter element in close contact and slanted. A strip of net-like backing or binding material adheres to the tips of a compressed pleat pack on one side of the pleat pack. This bound surface becomes the inner diameter of the pleated element as the pleat pack is formed into a cylinder. At this point, the filter element resembles a radially pleated element. Additional processing of the filter element, including rotational friction along the element outer diameter, creates the spiral pleat pattern, which may then be bound by an additional strip of net-like backing or binding material.

In still another example, U.S. Pat. Nos. 5,882,288 and 6,048,298 to Paul et al. (hereinafter Paul et al.) describe an apparatus to form spiral pleated filter cartridges. Paul et al. describe an apparatus designed to transform a radially pleated filter of an initial outer diameter into a spirally pleated filter of lesser final diameter. Similar to that described in Briggs, the apparatus imparts a rotational friction and compression along the outer diameter and creates the spiral pleat pattern. The pleat pattern is maintained due to friction with a snug fitting outer netting or plastic cage, which is inserted over the cylindrical pleat pack while compressed within the apparatus.

Different particularly useful machinery is capable of producing a pleat already in the laid-over state. A common technique utilizes a pusher bar or a set of pushing blades and a set of gripping rollers or gripping belts. Much like Stoyell et al., the pusher bar creates a "ballooning" of the media, then wedging the ends of the "ballooned" media into the grips of the gripping rollers. The gripping rollers advance and set a crease in the "ballooned" media under pressure and, in some cases, heat. The pleat pattern produced resembles that desired to form a circumferentially pleated filter element. Pleat formation is governed by the distance that the pusher bar advances and the relative drive speed of the gripping rollers. Often the drive of the pleater is described as a ratcheting motion or intermittently driven, where the drive tooling is designed to advance the gripping rollers a set fraction of a revolution for each advancement of the pusher bar. Some embodiments also include additional knife blades which aid in the "ballooning" of the media, similar to Stoyell et al., and also create minor variations of this flattened pleat pattern.

For the most part, these prior art efforts have fallen short in that the prior art pleating mechanisms are extremely specialized. The machine hardware is specifically designated to generate a pleat of particular height, angle, and degree of overlap. For example, to create standard radial pleats with Harms, II, an operator must change the location of the scoring wires so that the scoring wires are equally spaced around the circumference of the pleater roller or change to an entirely different roller all together. In addition, it has been demonstrated that this method of pleating is less successful when pleating polymeric or meltblown media, which is less prone to score. Excess pressure is necessary to create the desired effect, which leads quickly to worn out tooling, such as loose or stretched scoring wires. The noise from such operation is also described as unbearable.

Further, U.S. Pat. No. 297,240 to Liebeskind (hereinafter Liebeskind) describes a method of applying an adhesive tape on top a pleated pattern. Pleater pusher knives create the media "ballooning" upstream of gripping rollers. Just past the pusher knives and just before the gripping rollers, a narrow strip of adhesive tape is applied and fastened to the media. The adhesive tape functions the locally adhere and retard the advancement of the lateral pleat and create a counter-pleat referred to as a cusp. The pleated/counter-pleated material and the adhered tape undergo a heat cycle to permanently set the pleat pattern. The adhesive tape is then removed. Liebeskind relates more closely to the garment industry, where a counterpleat is created for aesthetic appeal. The tape is a mere temporary medium to create this effect. No benefits of counterpleating within the scope of filtration are currently recognized.

U.S. Pat. No. 3,349,159 to Luboshez (hereinafter Luboshez) describes a method of applying release paper to each side of the pleat pack, resulting in a sandwiched pleat pack. The release paper holds and protects the pleated media as it undergoes a heat cycle to set the pleats. Then, the release paper is removed. The resulting pleat pattern is a series of laid-over pleats extending laterally the width of the media. Like Liebeskind, Luboshez is in the field of the garment industry, where the pleated media is woven and sensitive to scorching at the temperatures experienced during processing.

U.S. Pat. No. 3,390,218 to Painter et. al (hereinafter Painter et al.) describes a method of pleating media utilizing sets of rollers. A set of vertically stacked double rollers create a feed nip to push material into what is described as a compression zone. This zone is confined vertically by moveable pressure plates or other fixturing and a downweb retarder roll, which rotates at a speed slower than the initial set of rollers to create a crumpling of media in the compression zone. The crumpled media eventually passes between the retarder roll and the bottom roller of the feed nip to create an exit nip. The pleats are laid over or compressed into what are described as micropleats in patterns which may be varied cross-web, if so desired, depending on circumferential grooves on the top upstream stacked roller. Pleat height and orientation are determined by roller speeds relative to one another, circumferential groove pattern, and pressure plate position within the compression zone. One embodiment of this invention creates a puckered pleat pattern, where a small pleat and a large pleat alternate in pattern down web as well as cross web. In cross-section, however, this puckered pleat resembles a "W" pleat in a partially laid-over position. In Painter et al, the control of overlap is irregular. The overlap depends entirely on the crumple characteristics of non-scored media in the compression zone. The vertically stacked rollers and compression zone cannot affect the media grip from the retarder roller. Further, the machine of Painter et al. also produces highly specialized pleats and would not be able to produce standard radial pleats without substantial machine alterations. As can be seen from above, there are several disadvantages associated with existing pleating machinery.

SUMMARY OF THE DISCLOSURE

The subject disclosure is directed to a system for fabricating a plurality of possible pleat packs used in the formation of circumferentially pleated filter sleeves, the system comprising: a substantially horizontal contact, and to a method for fabricating a plurality of possible pleat packs used in the formation of circumferentially pleated filter sleeves.

In one representative embodiment of the disclosure, a system for fabricating a plurality of possible pleat packs used in the formation of circumferentially pleated filter sleeves, the system comprising: a substantially horizontal contact surface; a pleating machine having cutting structure operatively positioned proximate the substantially horizontal contact plane, for delivering continuous upstanding pleat packs of a predetermined pleat formation to the horizontal contact surface; structure for guiding the upstanding pleat packs received from the pleating machine into a flattened condition; structure for securing the pleat packs in the flattened condition; and structure for forming the flattened pleat packs into a predetermined length for subsequent formation into sleeves of circumferential pleats.

In accordance with another representative embodiment of the disclosure, a method for fabricating a plurality of possible pleat packs used in the formation of circumferentially pleated filter sleeves, the method comprising the acts of: providing a substantially horizontal contact surface; providing a pleating machine having cutting structure, operatively positioned proximate the substantially horizontal contact plane, for delivering continuous upstanding pleat packs of a predetermined pleat formation to the horizontal contact surface; providing structure for guiding the upstanding pleat packs received from the pleating machine into a flattened condition; providing structure for securing the pleat packs in the flattened condition; and providing structure for forming the flattened pleat packs into a predetermined length for subsequent formation into sleeves of circumferential pleats.

These and other aspects of the bag-type filter assembly of the subject disclosure will become more readily apparent to those having ordinary skill in the art from the following detailed description of the disclosure taken in conjunction with the drawings described below.

BRIEF DESCRIPTION OF DRAWINGS

So that those having ordinary skill in the art to which the subject disclosure appertains will more readily understand how to make and use the filter assembly of the subject disclosure, presently preferred embodiments thereof will be described in detail hereinbelow with reference to the drawings, which are briefly described below.

FIGS. 28a-28c are a set of illustrations depicting the steps of manually forming a filter sleeve having a plurality of circumferential pleats constructed in accordance with the subject disclosure.

FIGS. 29a-29b are a set of illustrations depicting the manner in which the pleats packs of the subject invention are automatically rolled into a fixture for thermal sonic welding to form into a sleeve.

DETAILED DESCRIPTION

Figure 1:
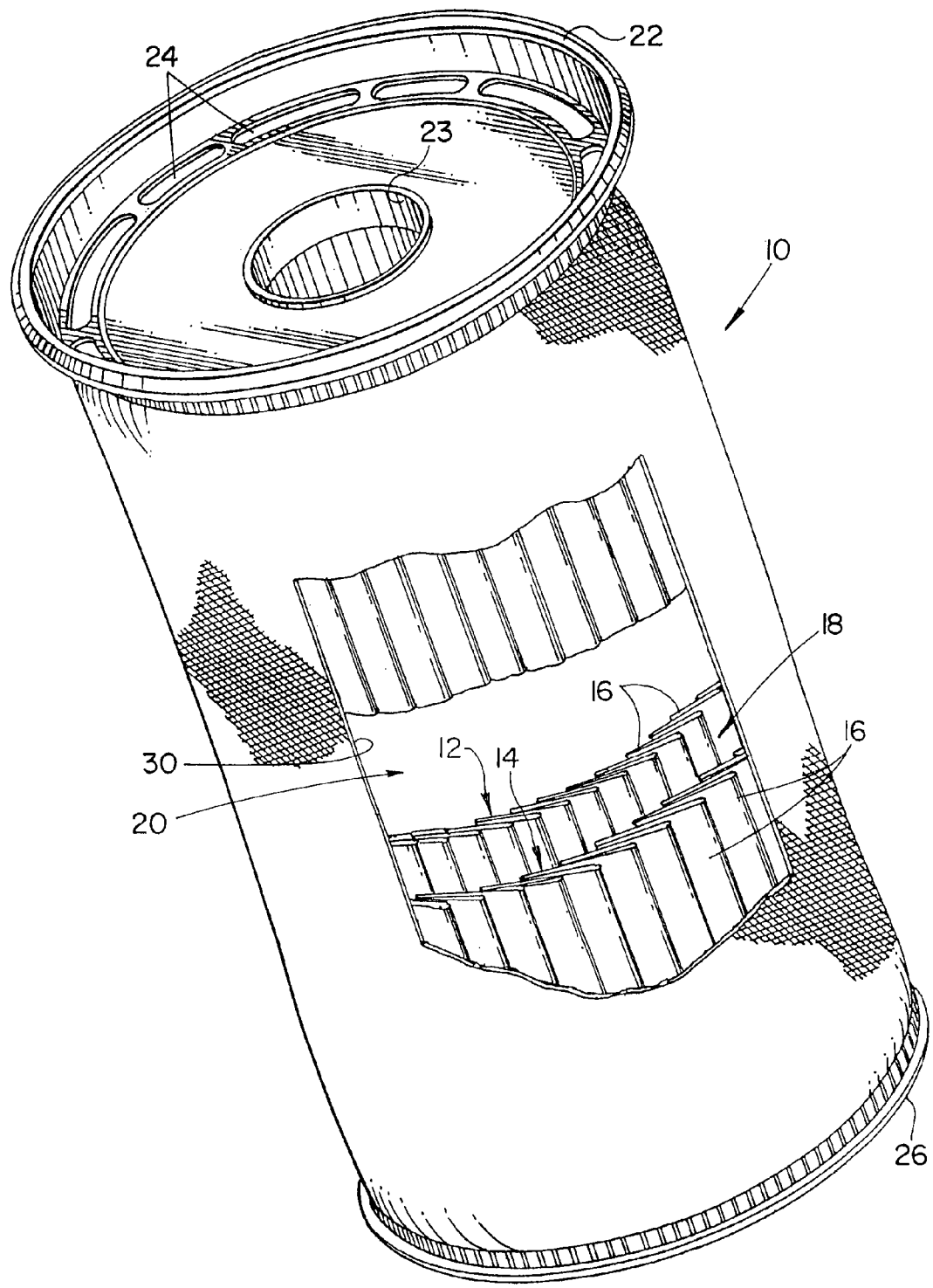
FIG. 1 is a perspective view of a filter assembly constructed in accordance with a presently preferred embodiment of the subject disclosure, wherein a portion of the outer sheath that surrounds the filter element is cutaway to reveal the inner and outer circumferentially pleated filter sleeves which form the filter element, and wherein the pleated filter sleeves are partially sectioned to reveal the pleat configuration thereof and the fluid passage defined therebetween.

Referring now to the drawings wherein like reference numerals identify similar structural elements and/or features of the subject disclosure, there is illustrated in FIG. 1 a filter assembly constructed in accordance with a presently preferred embodiment of the subject disclosure and designated generally by reference numeral 10. Filter assembly 10 is a type of filter assembly commonly referred to as a bag-type filter, which is preferably collapsible and readily disposable after use.

Referring to FIG. 1, the filter assembly 10 includes a generally cylindrical inner filter sleeve 12 and a generally cylindrical outer filter sleeve 14. The inner and outer filter sleeves 12, 14 are each formed, at least in part, from a plurality of longitudinally extending, circumferentially disposed arcuate pleats 16, which will be described in greater detail below. The pleats 16 are used to increase the amount of effective filtration area within the filter assembly relative to prior art bag-type filters. The effective surface area is the amount of filter media that is accessible to fluid during use. An elongated annular passage 18 is defined between the inner and outer pleat sleeve 12, 14, for receiving unfiltered fluid, and the inner filter sleeve 12 defines a central bore 20 of the filter assembly 10 for fluid transfer.

Figure 2:
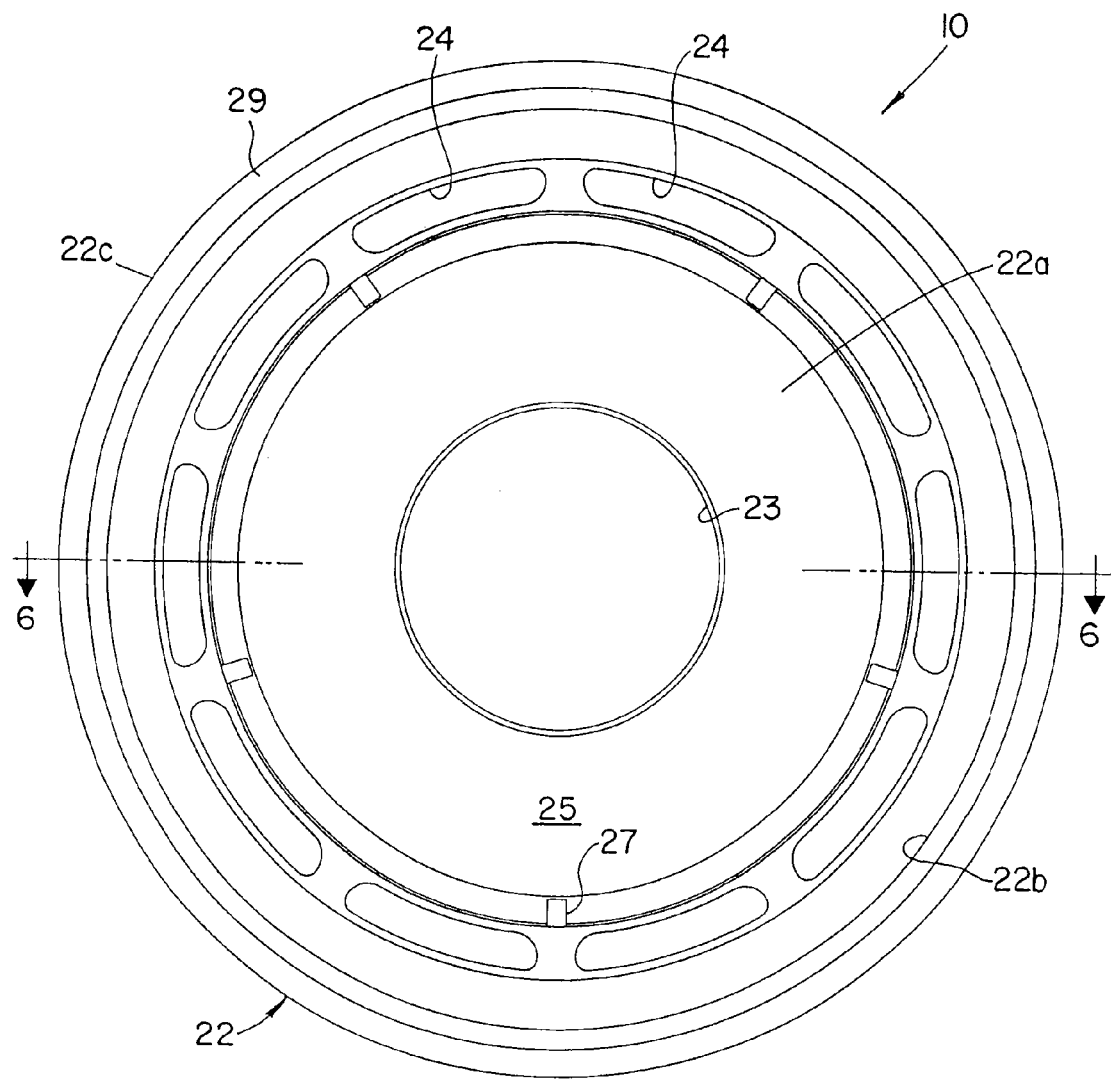
FIG. 2 is a top end view of the filter assembly of FIG. 1, illustrating the structural features of the inlet cap disposed at the upper end of the filter assembly, which includes a plurality of circumferentially spaced apart arcuate inlet ports for admitting fluid into the fluid passage defined between the pleated filter sleeves.

An inlet cap 22 is secured to an upper or first end of the inner and outer filter sleeves 12, 14, in a manner, which will be discussed in greater detail below with reference to FIG. 6. Inlet cap 22, which is best seen in FIG. 2, includes a plurality of circumferentially disposed arcuate inlet ports 24 and a central access port 23. Inlet ports 24 communicate with the annular passage 18 defined between the inner and outer filter sleeves 12, 14 for facilitating the ingress of unfiltered fluid into the passage. The central access port 23 of inlet cap 22 is adapted and configured to mount or otherwise sealingly accommodate an inlet conduit (see FIG. 8), which passes through the central bore 20 of the filter assembly 10 to deliver unfiltered fluid to the inlet ports 24 of inlet cap 22.

Referring to FIG. 2, inlet cap 22 is preferably formed from a high-strength, lightweight, plastic material, such as polypropylene. For ease of assembly, the inlet cap 22 is formed from two distinct structural elements, including an inner body portion 22a and an outer flange portion 22b. The inner body portion 22a of inlet cap 22 defines an impervious annular end surface 25 that defines the central access port 23. Access port 23 is dimensioned and configured to accommodate an inlet conduit, which delivers unfiltered or otherwise untreated fluid into the trough formed by inlet cap 22. The outer flange portion 22a of inlet cap 22 defines the inlet ports 24 that communicate with annular passage 18.

Figure 2A:
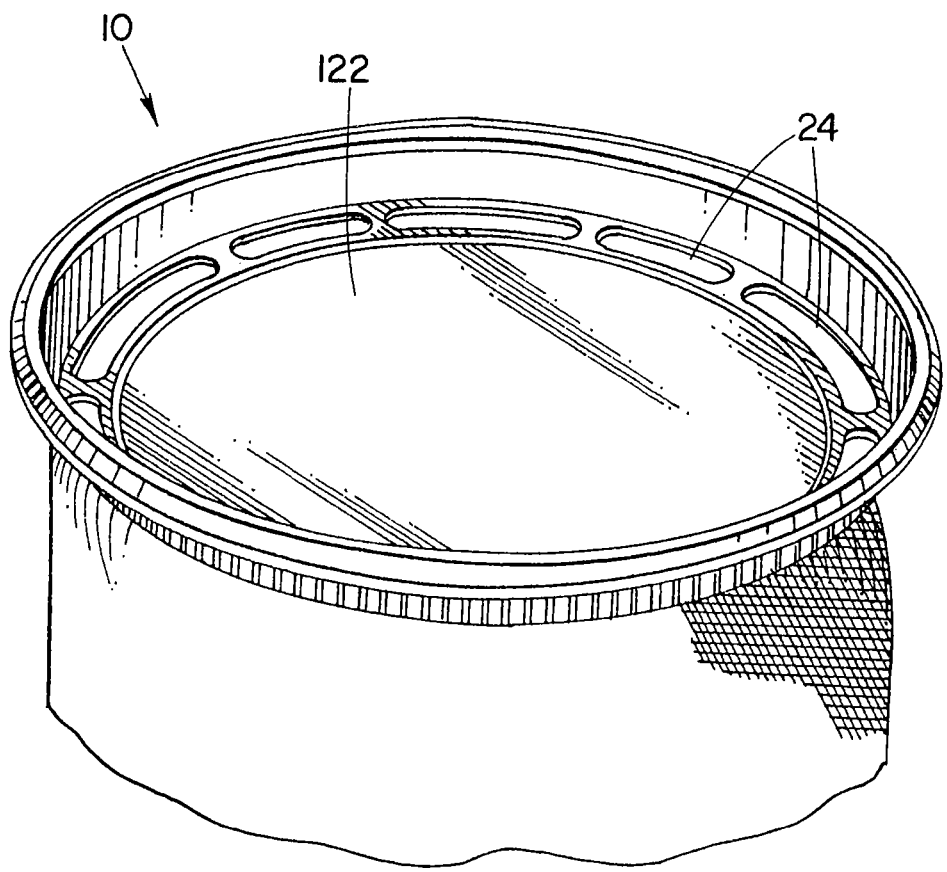
FIG. 2a is a partial perspective view of a filter assembly of the subject disclosure, which includes a closed inlet cap, as compared to the open inlet cap shown in FIG. 2.

In another embodiment of the present disclosure, which is illustrated in FIG. 2a, the inlet cap 122 is closed or blind, and thus there is no central access port formed in the end surface thereof. In such an instance, the inlet conduit, which delivers unfiltered fluid to inlet ports 124 of inlet cap 122, communicates with the filter assembly through the top or cover of the housing, which supports the filter assembly.

The two component parts of the inlet cap 22 are preferably mechanical secured together through the interaction of a number of locking features including a plurality of circumferentially spaced apart engagement tabs 27 formed on the inner body portion 22a of the inlet cap 22 and a plurality of corresponding recesses (not shown) formed on the outer flange potion 22b of the inlet cap 22. In addition, while not shown, a series of arcuate tabs project radially inwardly from the outer body portion 22b to engage a corresponding annular lip formed on the surface of the inner body portion 22a. Alternate means of securing or otherwise fastening or joining the two components of the inlet cap together may be employed. It is also envisioned that inlet cap 22 can be formed as a single unitary member.

Figure 6:
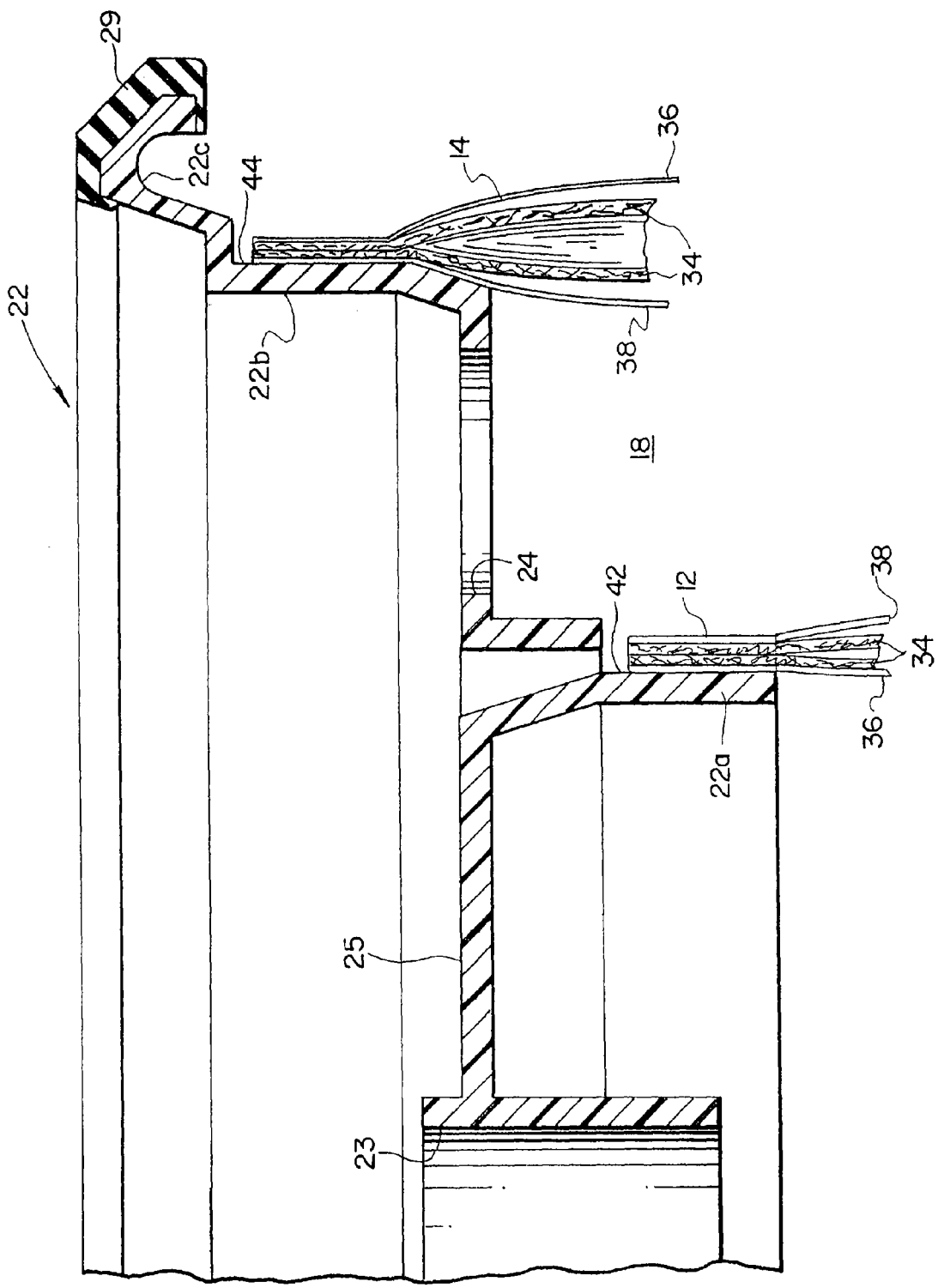
FIG. 6 is a cross-sectional view of a portion of the inlet cap shown in FIG. 2, taken along line 6-6, illustrating the manner in which the inner and outer sleeves of the filter element are secured to the inlet cap.

The outer flange portion 22b of inlet cap 22 also has a radially outer shoulder 22c that may include an elastomeric over-molded sealing surface 29, best seen in FIG. 6. The over-molded sealing surface 29 improves the seal interface between the inlet cap 22 of filter assembly 10 and the housing which supports the filter assembly 10 during use, as shown for example in FIG. 8. An over-molded seal of this type is disclosed in a commonly assigned U.S. Provisional Patent Application Ser. No. 60/404,111 entitled "Seal For Collapsible Filter Element," filed dated Aug. 15, 2002, which is incorporated by reference herein.

Figure 3:
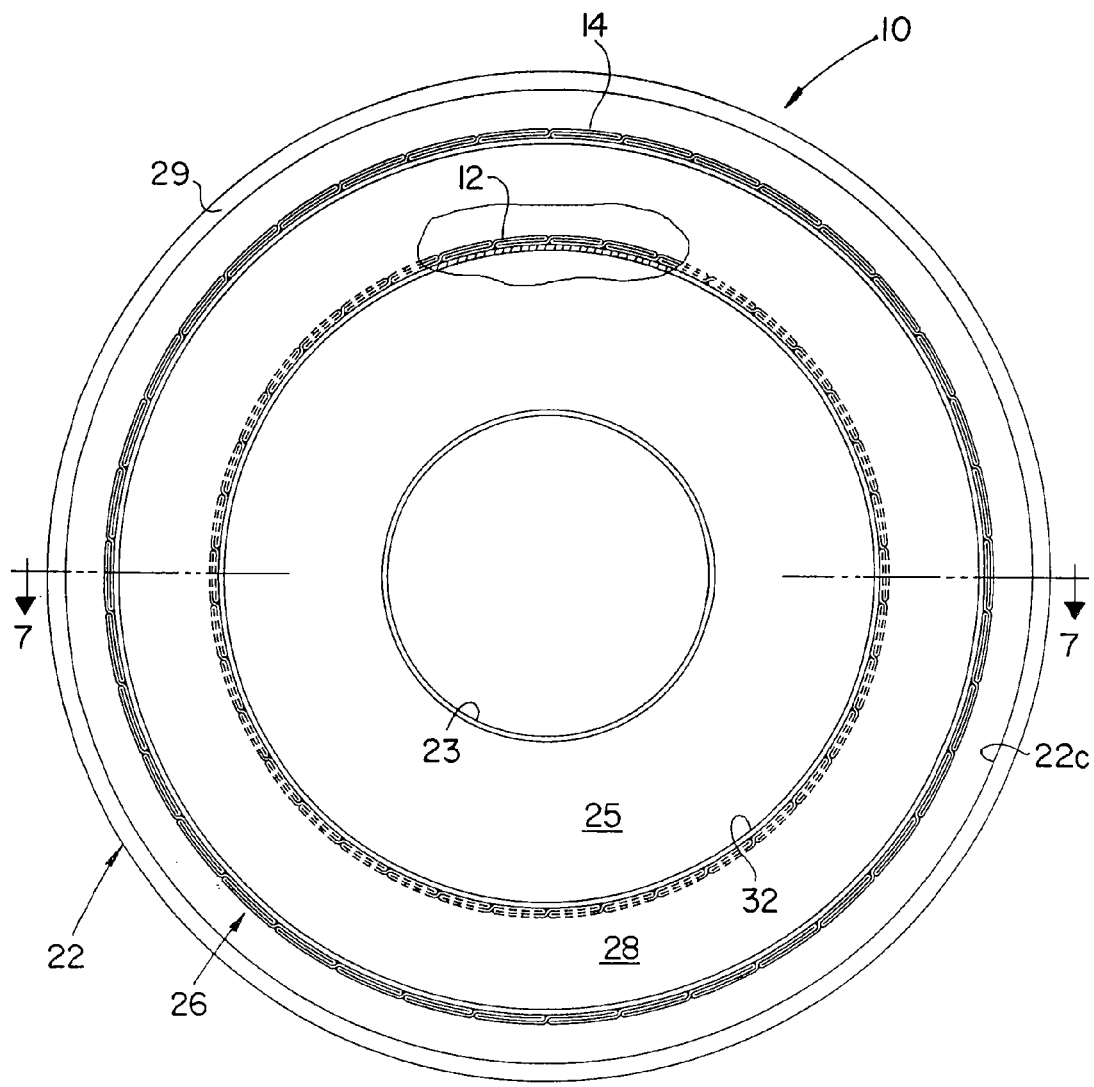
FIG. 3 is a bottom end view of the filter assembly of FIG. 1, illustrating the structural features of the end cap disposed at the lower end of the filter assembly, which has an annular end surface closing the passage defined between the pleated filter sleeves.

Referring again to FIG. 1, an end cap 26 is secured to a lower or second end of the inner and outer filter sleeves 12, 14, in a manner, which will be discussed in greater detail below with reference to FIG. 7. As best seen in FIG. 3, end cap 26, has an impervious annular end surface 28 closing the annular passage 18 between the inner and outer filter sleeves 12, 14. End surface 28 prevents the egress of unfiltered fluid from filter assembly 10. In addition, end cap 26 has a relatively large central exit port 32 communicating with the central bore 20 formed by inner filter sleeve 12 to facilitate the egress of filter fluid from the filter assembly 10, and to permit the passage of the inlet conduit shown in FIG. 8. It is envisioned and encompassed by the subject disclosure that end cap 26 could be formed from two separate components. These components would be configured and assembled in a manner similar to the two component parts of the inlet cap 22.

With continuing reference to FIG. 1, a sheath 30 surrounds the outer filter sleeve 14 and is formed from a material having a relatively open porosity, such as for example, a polymeric mesh or screen. Sheath 30 serves to ease the installation of the filter assembly 10 into a basket (not shown), by reducing hang-ups of the pleats on the sides of the basket. It is envisioned that this same type of sheathing may be associated with the radially inner surface of the inner filter sleeve 12, within the central bore 20 of filter assembly 10, to protect the inner filter sleeve 12 from the basket during installation and to ease removal.

Figure 1A:
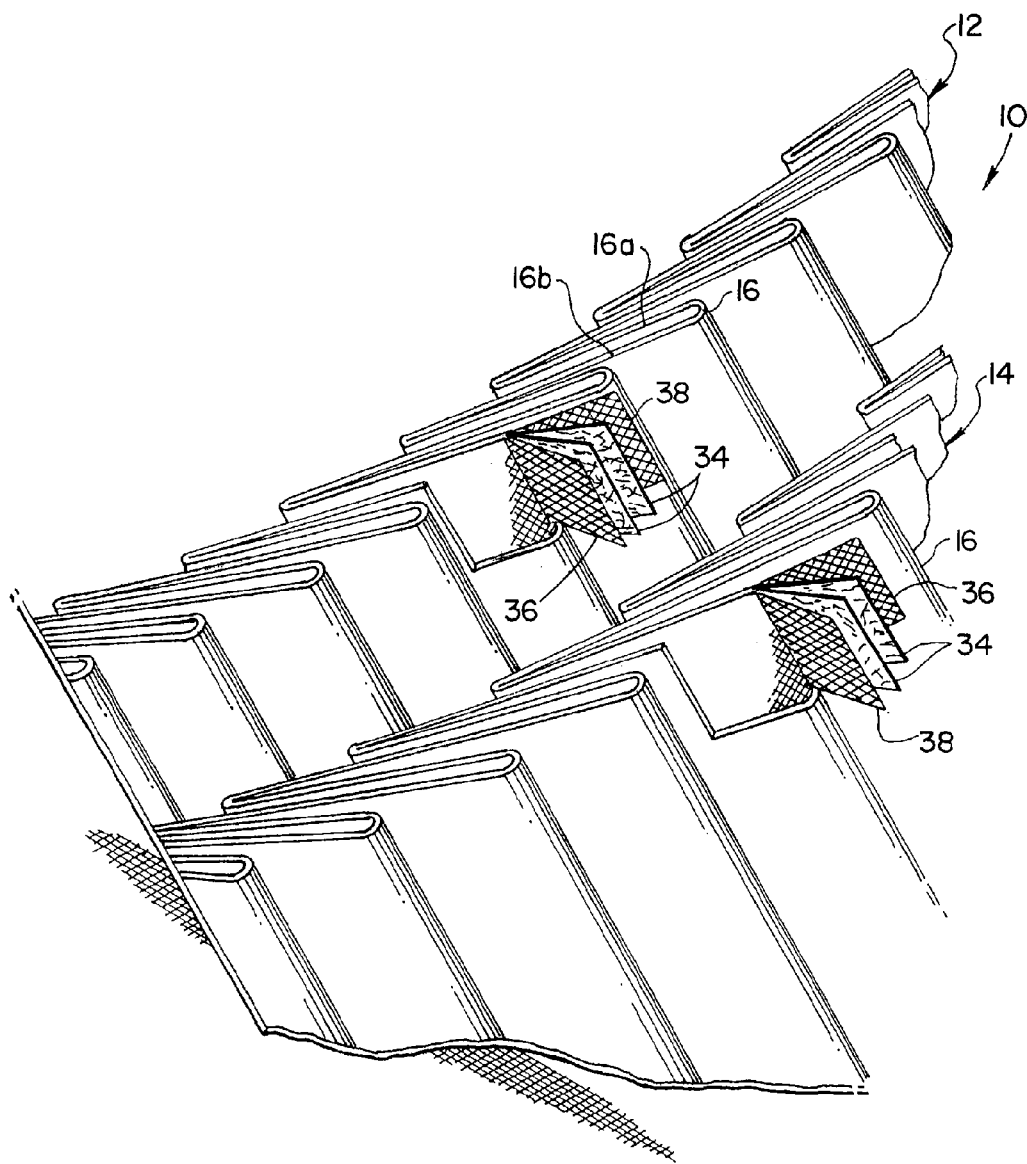
FIG. 1a is an enlarged localized perspective view of the pleated filter sleeves shown in FIG. 1, wherein a section of a pleat of each sleeve is divided to illustrate the upstream drainage/support layer, the downstream drainage/support layer and the plural media layers which form the pleated composite.

Referring now to FIG. 1a, the inner and outer filter sleeves 12, 14 of filter assembly 10 are each formed by a multi-layered pleated composite. The pleated composite structure may be produced on a conventional pleating machine, such as a pusher bar pleater, blade type pleater, or gear type pleater or it may be formed by conventional folding techniques. Alternatively, it is envisioned that the pleated composite could be produced using a device in which the media is wrapped or otherwise formed about a mandrel that is repeatedly indexed in a reciprocating or similar manner.

The composite preferably includes one or more layers of filter media 34, an upstream support/drainage layer 38 and a downstream support/drainage layer 36. In the case of the outer filter sleeve 14, the upstream support/drainage layer 38 is associated with the radially inner side of the sleeve, while the downstream support/drainage layer 36 is associated with the radially outer side of the sleeve. Conversely, in the case of the inner filter sleeve 12, the upstream support/drainage layer 38 is associated with the radially outer side of the sleeve, while the downstream support/drainage layer 36 is associated with the radially inner side of the sleeve.

The upstream and downstream drainage/support layers 36, 38 of the multi-layered composite from which the inner and outer filter sleeves 12, 14 are formed can be made of any material having suitable drainage characteristics. For example, the drainage/support layers 36, 38 can be in the form of a mesh or screen or a porous woven or non-woven sheet. Meshes and screens come in various forms including metallic meshes that are often used for high temperature filtration applications, and polymeric meshes that are typically used for lower temperature applications. Polymeric meshes come in the form of woven meshes and extruded meshes. Either type may be employed. It is envisioned that the upstream and downstream drainage/support layers 36, 38 of the inner and outer sleeves 12, 14 can be made from the same or different material depending upon the filtration application in which filter assembly 10 is employed.

The filter media layers 34 of the multi-layered composite from which the inner and outer filter sleeves 12, 14 are formed can be selected in accordance with the fluid to be filtered and the desired filtering characteristics. The filter medium can comprise a porous film, i.e. microporous membrane or a fibrous sheet or mass i.e. needled felt, melt-blown, glass fiber, etc. It may have a uniform or graded pore structure and any appropriate effective pore size, and it may be formed from any suitable material, such as a natural material or synthetic polymer. As compared to conventional radial pleated filters or spiral pleated filters, the filter assembly of the subject disclosure can employ relatively thick filter media and support/drainage material without reducing the effective filtration area of the filter assembly.

It is also envisioned that the filter media can include two or more layers of media having different filtering characteristics, wherein one layer would serve as a prefilter for the other layer. In one embodiment of the disclosure, the multi-layered composite from which the inner and outer sleeves 12, 14 are formed includes plural layers of filter media 34 each having the same porosity. In another embodiment of the disclosure, the multi-layered composite from which the inner and outer sleeves 12, 14 are formed includes plural layers of filter media 34 each having a different porosity. In such an instance, layers of more open, i.e., less retentive, grades of media would be disposed on the upstream side of the composite and layers of tighter, i.e., more retentive, grades of media would be disposed on the disposed downstream side of the composite. It is also envisioned that a layer or layers of non-pleated media more open than the most open pleated media layer, can be positioned on the upstream side of both pleated filter sleeves 12, 14. These layers would serve to reduce the loading on the downstream pleated medias, promoting extended life.

It is also envisioned and well within the scope of the subject disclosure that the composite from which filter sleeves 12, 14 are formed can consist of one or more layers of media laminated to one or more layers of a support/drainage material. For example, a fluoropolymer media may be laminated to a spunbonded polypropylene support/drainage material. Alternatively, a fluoropolymer media layer laminated to a polypropylene symmetric or asymmetric mesh or netting. There are significant advantages to using such laminated materials, including improvements in inventory, manufacturing and assembly.

In an exemplary embodiment of the subject disclosure, the material defining the filter media layers 34 of the inner and outer filter sleeves 12, 14 are meltblown polypropylene medias. The material defining the upstream support layers 38 of the inner and outer filter sleeves 12, 14 is polymeric netting, and the material defining the downstream drainage layers 36 of the inner and outer filter sleeves 12, 14 is a non-woven spunbond material. In this exemplary embodiment of the subject disclosure, the inner pleated filter sleeve 12 has an inner diameter of about 4.750" and the outer pleated filter sleeve 14 has an outer diameter of about 6.687". These dimensions are dependent upon the dimensions of the basket within which the filter assembly is deployed for service.

It is envisioned that the longitudinally extending circumferentially disposed arcuate pleats 16 of the inner filter sleeve 12, the outer filter sleeve 14 or both the inner and outer filter sleeves 12, 14 have equal arc length. Each arcuate pleat 16 has a pair of legs, including a radially inner leg 16a and a radially outer leg 16b, as illustrated for example in FIG. 1a. The two legs 16a, 16b of each pleat 16 have a different arc length or arcuate height. The arc length of the radially inner pleat leg 16a is typically shorter or less than the arc length of the radially outer pleat leg 16b. For purposes of this disclosure, the overall arcuate height of each pleat 16 is measured relative to the inner pleat leg 16a thereof.

In one exemplary embodiment of the disclosure, the arc length or arcuate height $h_i$ of the radially inner leg 16a of each pleat 16 is about 1.0 inch and the arc length or arcuate height $h_o$ of the radially outer leg 16b of each pleat 16 is about 1.5 inches. In another exemplary embodiment of the disclosure, the arc length or arcuate height $h_i$ of the radially inner leg 16a of each pleat 16 is about 0.75 inches and the arc length or arcuate height $h_o$ of the radially outer leg 16b of each pleat 16 is about 1.125 inches.

Figure 4:
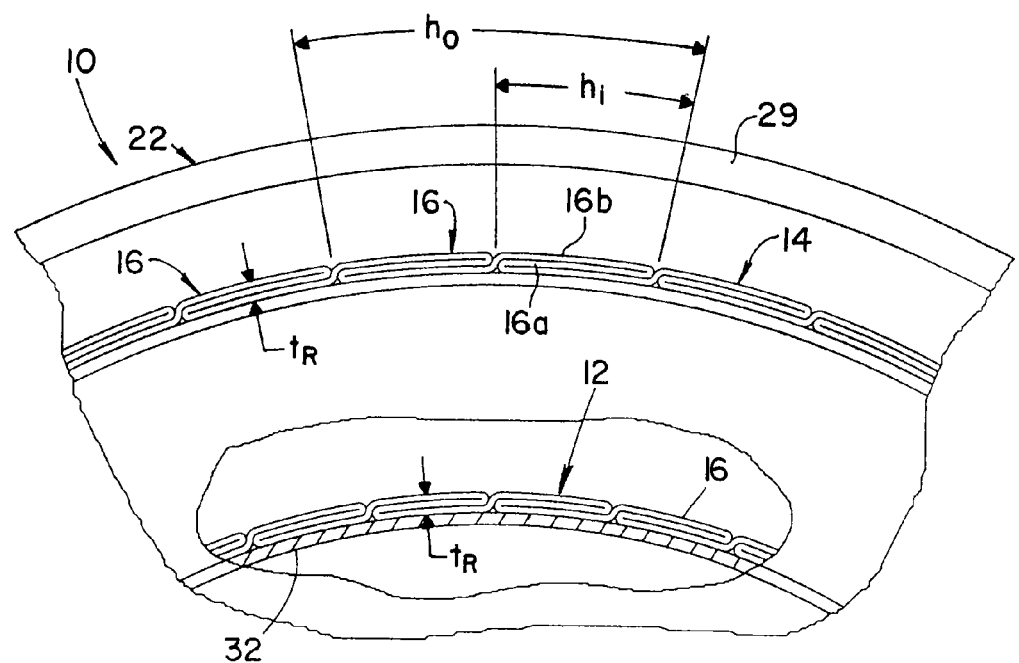
FIG. 4 is an enlarged localized end view of the filter assembly, with a portion of the end cap broken away to reveal the pleat configuration of the inner filter sleeve, and wherein adjoining circumferentially disposed arcuate pleats of the inner and outer filter sleeves abut one another, whereby the crest of one pleat follows the base of an adjoining pleat.

It is envisioned that adjoining or otherwise adjacent circumferentially disposed arcuate pleats 16 of the inner filter sleeve 12, the outer filter sleeve 14 or both the inner and outer filter sleeves 12, 14 and are uniformly distributed about the circumference of the inner and outer filter sleeves 12, 14. That is, the pleats are uniformly spaced from one another, so that there is no pleat overlap, as shown for example in FIG. 4. In other words, the crown or top of each pleat 16 resides at or near the root or base of an adjoining pleat 16, unlike conventional radially pleated cartridges wherein the roots and crowns of the pleats are radially spaced from one another. Consequently, the inner and outer filter sleeves 12, 14 of filter assembly 10 have a substantially continuous radial thickness $t_R$ equal to three (3) times the thickness of a pleat leg, about substantially the entire circumference of each filter sleeve. In this instance, the circumference "C" of each filter sleeve 12, 14 is defined by the following equation:

$$C = h_i \cdot N$$

where N is the number of pleats forming the filter sleeve.

It is also envisioned that adjoining or otherwise adjacent circumferentially disposed arcuate pleats 16 of the inner filter sleeve 12, the outer filter sleeve 14, or both the inner and outer filter sleeves 12, 14 partially overlap one another. In accordance with the subject disclosure, adjoining or otherwise adjacent circumferentially disposed arcuate pleats 16 of the inner filter sleeve 12, the outer filter sleeve 14 or both the inner and outer filter sleeves 12, 14 can overlap one another over approximately 50% to 80% of the arc length of the pleats, measured relative to the amount the inner pleat leg 16a of one pleat overlaps the inner pleat leg 16a of an adjoining pleat.

Figure 5:
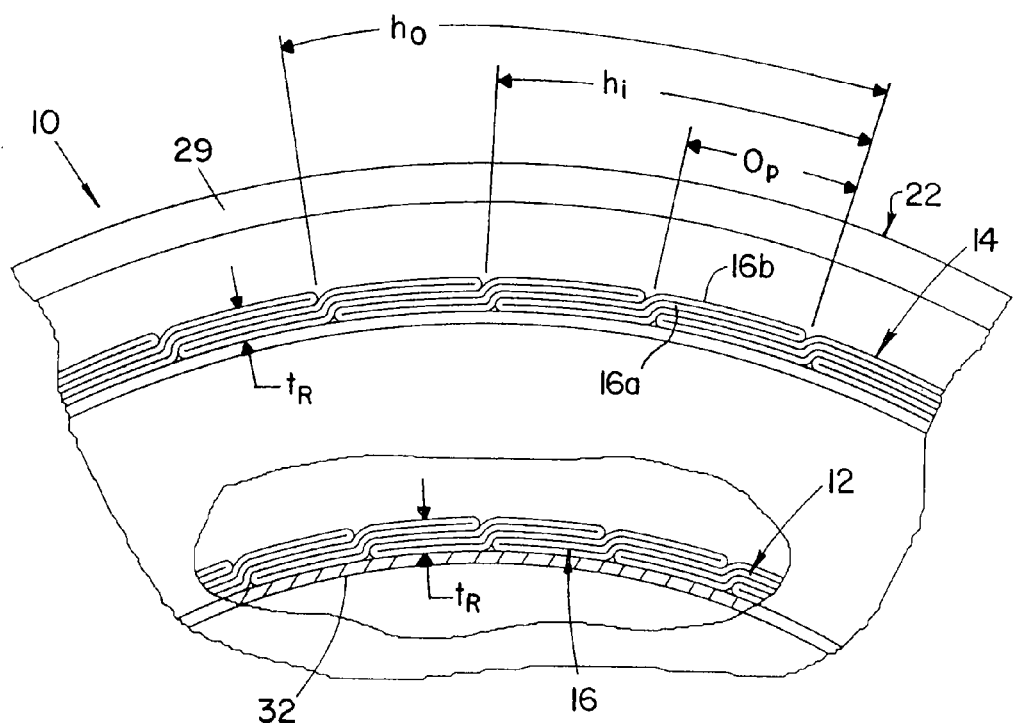
FIG. 5 is an enlarged localized end view of the filter assembly, with a portion of the end cap broken away to reveal the pleat configuration of the inner filter sleeve, and wherein adjoining circumferentially disposed arcuate pleats of the inner and outer filter sleeves partially overlap one another.

In one example shown in FIG. 5, the pleats 16 of both the inner and outer filter sleeves 12, 14 overlap one another over approximately 50% of the arc length of the pleats. Consequently, the inner and outer filter sleeves 12, 14 have a substantially continuous radial thickness $t_R$ equal to five (5) times the thickness of a pleat leg, about substantially the entire circumference of each filter sleeve. In this instance, the circumference "C" of each filter sleeve 12, 14 is defined by the following equation:

$$C = h_i \cdot N \cdot O_p$$

where N is the number of pleats forming the filter sleeve and $O_p$ is the percentage of overlap that exists between two adjacent pleats in the filter sleeve.

Thus, if the arc length or arcuate height $h_i$ of the radially inner leg 16a of each pleat 16 is about 1.0 inch and the arc length or arcuate height $h_o$ of the radially outer leg 16b of each pleat 16 is about 1.5 inches, one-third of the arcuate pleat height or 0.5 inches of the upstream and downstream surfaces of the outer pleat leg 16b of each pleat 16 will be exposed or otherwise out of contact with the surface of an adjacent pleat leg. Similarly, if the arc length or arcuate height $h_i$ of the radially inner leg 16a of each pleat 16 is about 0.75 inches and the arc length or arcuate pleat height $h_o$ of the radially outer leg 16b of each pleat 16 is about 1.125 inches, one-third of the arcuate pleat height or 0.375 inches of the upstream and downstream surfaces of the outer pleat leg 16b of each pleat 16 will be exposed or otherwise out of contact with the surface of an adjacent pleat leg.

In accordance with the subject disclosure, the total amount of overlap $O_T$ that exists between adjacent pleats 16 in a filter sleeve 12, 14 is defined by the following equation:

$$O_T = h_i \cdot O_p$$

Referring to FIG. 6, as mentioned above, inlet cap 22 is secured to the upper end of the inner and outer filter sleeves 12, 14. Specifically, the multi-layered composite structure of filter sleeves 12, 14 is ultrasonically welded, heat bonded or otherwise secured to the inlet cap 22 using any commonly known attachment method. The upper portion of the inner pleated filter sleeve 12 is directly secured to the outer peripheral surface of wall 42 of the inner body portion 22a of inlet cap 22. Similarly, the upper portion of the outer pleated filter sleeve 14 is directly secured to the outer peripheral wall 44 of the outer flange portion 22b of inlet cap 22.

Figure 7:
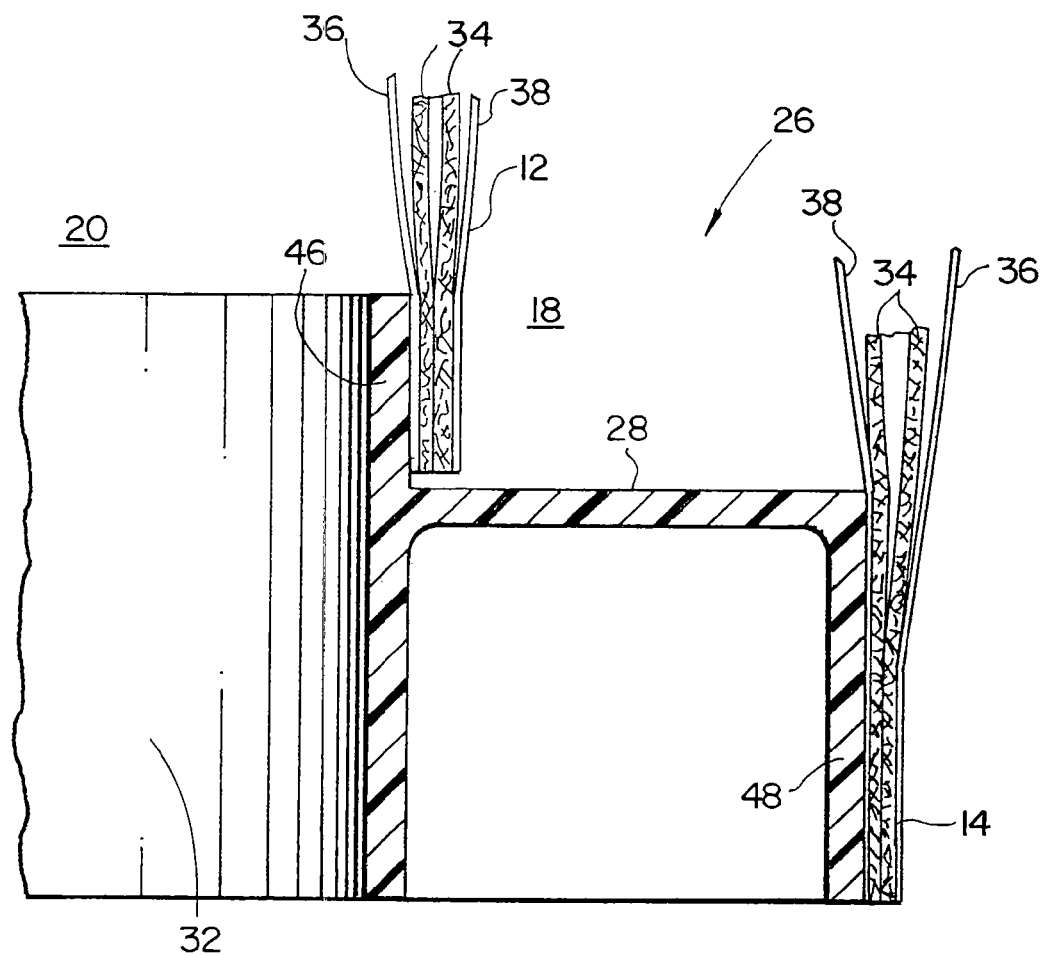
FIG. 7 is a cross-sectional view of a portion of the end cap shown in FIG. 3, taken along line 7-7, illustrating the manner in which the inner and outer sleeves of the filter element are secured to the end cap.

Referring to FIG. 7, as mentioned above, end cap 26 is secured to the lower end of the inner and outer filter sleeves 12, 14. Specifically, the multi-layered composite structure of filter sleeves 12, 14 is ultrasonically welded, heat bonded or otherwise secured to the end cap 26 using any commonly known attachment method. The lower portion of the inner pleated filter sleeve 12 is directly secured to the outer peripheral surface of an upstanding flange wall 46 of end cap 26. Similarly, the lower portion of the outer pleated filter sleeve 14 is directly secured to the outer peripheral surface of wall 48 of the end cap 26.

Those skilled in the art will readily appreciate that securing the filter sleeves 12, 14 to exterior or outer peripheral surfaces of the inlet cap 22 and end cap 26, as explained above, allows for more flexibility and lower costs during assembly. Those skilled in the art will also appreciate that by welding, bonding or otherwise sealing the media and support layers to each other at both ends of filter assembly 10, in the manner described above and illustrated in FIGS. 6 and 7, unfiltered fluid must flow through all of the media layers of the filter sleeves 12, 14. This eliminates any chance of bypass and premature plugging of the final filter layers, and allows the user to get the maximum life out of the filter assembly 10 of the subject disclosure. This is in contrast to typical pleated cartridge filters, which are assembled with ends caps that are typically potted or otherwise bonded to the opposed ends of the pleats, making bypass possible if the pleat ends are not completely encased.

Figure 8:
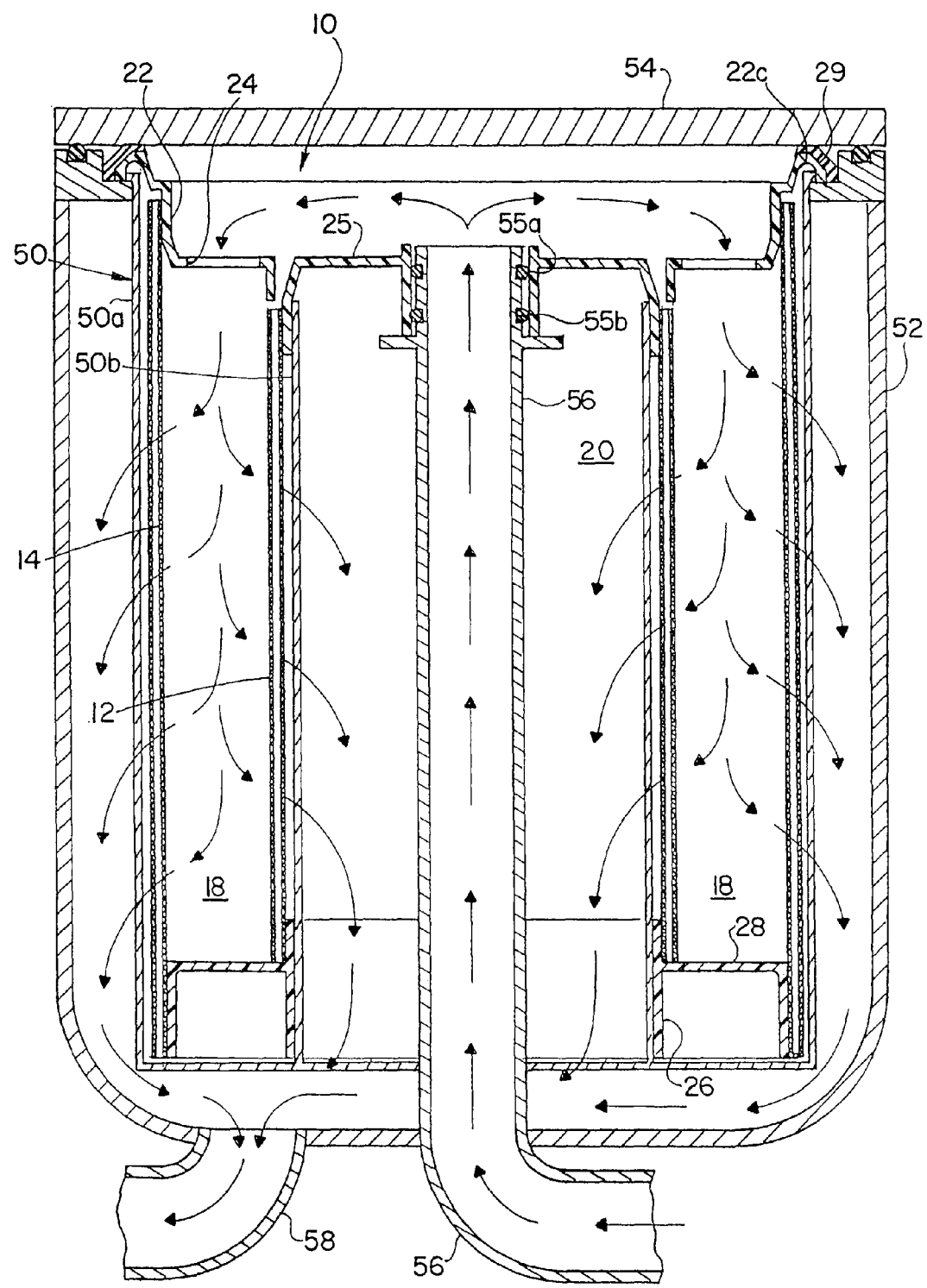
FIG. 8 is a cross-sectional view of the filter assembly of the subject disclosure disposed with a pressure vessel, wherein a series of arrows indicate the directional flow path of fluid through the filter assembly.

Referring now to FIG. 8, in use, the collapsible bag-type filter assembly 10 of the subject disclosure is disposed within a perforated basket or container 50, which is preferably metal. At such a time, the circumferential pleats 16 of the outer filter sleeve 14 are fully supported by the outer portion 50a of basket 50 and each other and therefore they will not shift during use. Additionally, the circumferential pleats 16 of the inner filter sleeve 12 are fully supported by the inner portion 50b of basket 50 and each other. Consequently, they will not shift during service. This allows for consistent pressure drops and longer filter life. The basket 50 is supported with a housing or pressure vessel 52, which has a removable top or cover 54. When the basket 50 is disposed within the housing 52, the over-molded elastomeric sealing surface 29 on the outer shoulder 22c of inlet cap 22 seals against the surface of housing cover 54. In addition, a pair of O-rings 55a, 55b, disposed about the upper end of the inlet conduit 56 of pressure vessel 52 sealingly engage the circumferential wall of the central access port 23 of inlet cap 22.

In operation, the inlet conduit 56 delivers unfiltered fluid into the trough formed by inlet cap 22, as indicated by the directional flow lines. The unfiltered fluid then flows through the plural inlet apertures 24 in inlet cap 22 and into the interior passage 18 formed between the inner and outer filter sleeves 12, 14 of filter assembly 10. Under pressure, the fluid is drawn through the pleated media layers of the inner and outer filter sleeves 12, 14 for filtration and conditioning. Thereafter, filtered fluid exits filter housing 52 through outlet conduit 58 at the bottom of the housing, as indicated by the directional flow lines.

Those skilled in the art will readily appreciate that the arrangement of the basket 50 and housing 52 illustrated in FIG. 8 is a non-limiting example of a system within which the filter assembly 10 may be employed. It is envisioned that the filter assembly 10 of the subject disclosure may be employed with other types of arrangements and systems without departing from the spirit or scope of the subject disclosure.

When the bag-type filter assembly 10 of the subject disclosure has exceeded its useful life, it may be easily removed from the housing 52. Upon removal, filter assembly 10 may be collapsed. This is accomplished by approximating the inlet cap 22 toward the end cap 26. The collapsed filter assembly may then be discarded. It should be appreciated by those skilled in the art that the size of the interior passage 18 of filter assembly 10 is relatively small as compared that of a standard bag-type filter which has only one filter media sleeve. Therefore, the hold-up volume associated with filter assembly 10 is substantially reduced as compared to a typical bag-type filter. The low hold-up volume promotes easy removal of the filter assembly 10 from the housing 52, and minimizes fluid loss, which can result in contamination of the area around the housing.

Figure 9:
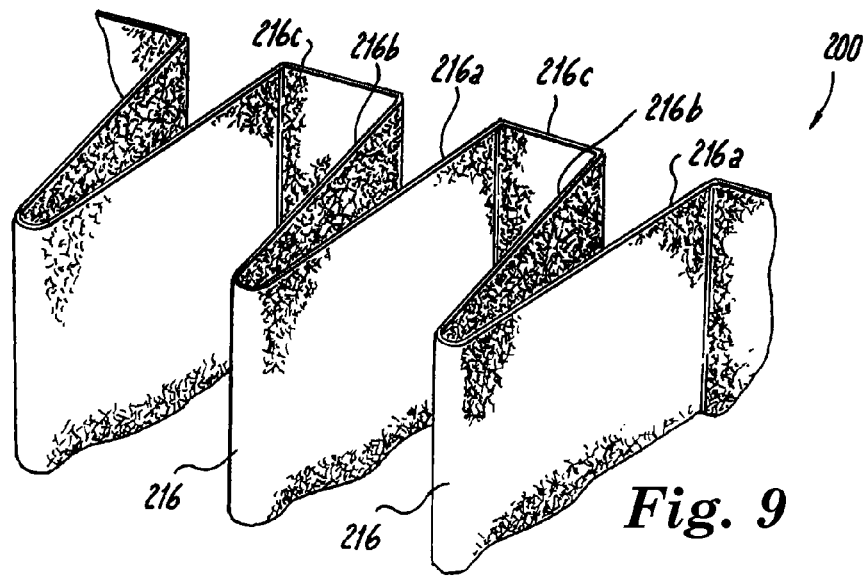
FIG. 9 is a perspective view of a pleat formation used to form the circumferential pleats of the subject disclosure, that includes upstanding pleats having first and second pleat legs of equal height, wherein the first pleat leg of one pleat is joined to the second pleat leg of a preceding pleat by a flat medial pleat section.
Figure 10:
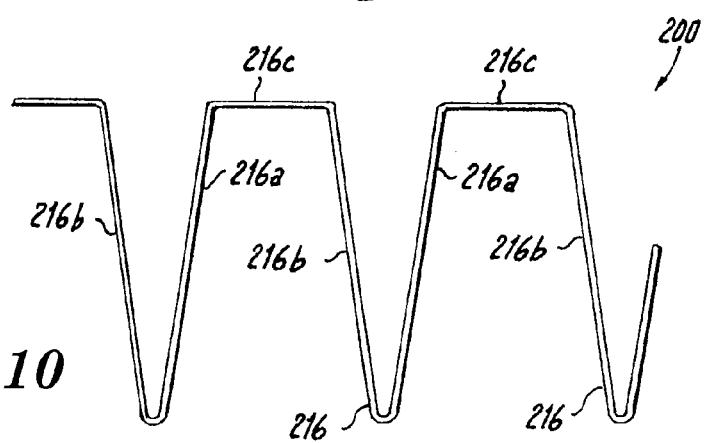
FIG. 10 is a top plan view of the pleat formation shown in FIG. 9.

Referring now to FIGS. 9 and 10, there is illustrated a pleat formation designated by reference numeral 200, which is used to form the circumferential pleats of the inner and outer filter sleeves of the filter assembly of the subject disclosure. Pleat formation 200 includes upstanding pleats 216, each having first and second pleat legs 216a and 216b of equal height. In pleat formation 200, the first pleat leg 216a of one pleat 216 is joined to the second pleat leg 216b of a preceding pleat 216 by a flat medial pleat section 216c.

Figure 11:
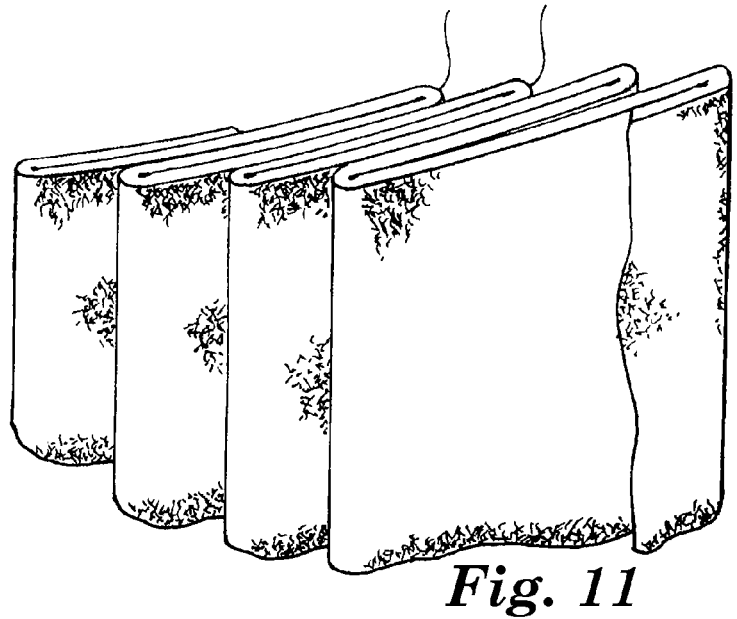
FIG. 11 is a perspective view of the circumferential pleats formed by moving the pleat formation of FIGS. 9 and 10 into an overlapped condition, wherein each medial pleat section becomes part of the second leg of a preceding pleat.

When the circumferential pleats of the subject disclosure are formed, the upstanding pleats 216 of pleat formation 200 are moved into an overlapped condition, which is shown in FIG. 11. In this overlapped condition, each medial pleat section 216*c* becomes part of the second leg 216*b* of a preceding pleat 216'. By way of example, if the height of each pleat leg 216*a*, 216*b* is 1.0 inch, and the length of the medial pleat section 216*c* is 0.050 inches, the resulting circumferential pleats 216' shown in FIG. 18 will each have a radially inner pleat leg with an arc length of 1.0 inch and a radially outer pleat leg with an arc length of 1.50 inches.

Figure 12:
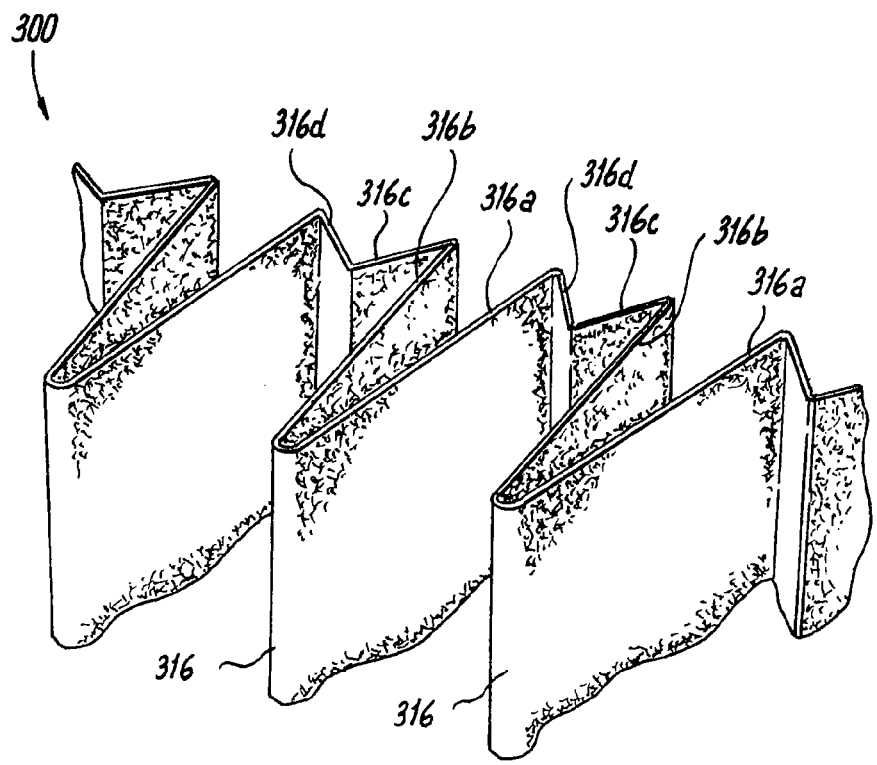
FIG. 12 is a perspective view of another pleat formation used to form the circumferential pleats of the subject disclosure, that includes upstanding pleats having first and second pleat legs of equal height, wherein the first pleat leg of one pleat is joined to the second pleat leg of a preceding pleat by a medial pleat section including two medial pleat segments of equal length.
Figure 13:
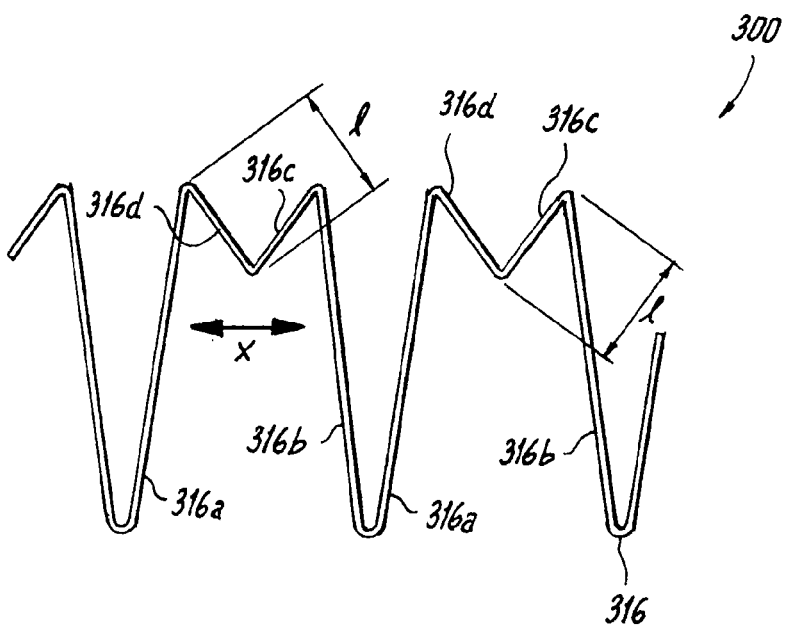
FIG. 13 is a top plan view of the pleat formation shown in FIG. 13.

Referring to FIGS. 12 and 13, there is illustrated another pleat formation designated by reference numeral 300, which is used to form the circumferential pleats of the inner and outer filter sleeves of the filter assembly of the subject disclosure. Pleat formation 300 includes upstanding pleats 316, each of which has first and second pleat legs 316*a* and 316*b* of equal height. In pleat formation 300, the first pleat leg 316*a* of one pleat 316 is joined to the second pleat leg 316*b* of a preceding pleat 316 by a medial pleat section that includes two medial pleat segments 316*c* and 316*d* of equal length "l". Thus, pleat formation 300 takes the form of a W-shape construction, consisting essentially of alternating tall and short pleats.

Figure 14:
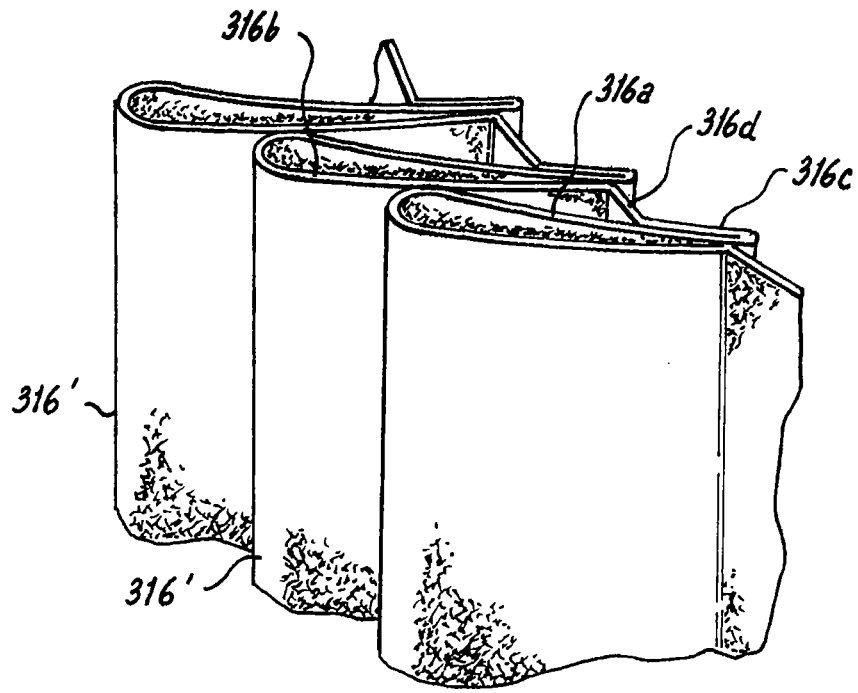
FIG. 14 is a perspective view of the circumferential pleats formed by moving the pleat formation of FIGS. 12 and 13 into an overlapped condition, wherein the two medial pleat segments of equal length are flattened to become part of the second leg of a preceding pleat.
Figure 15:
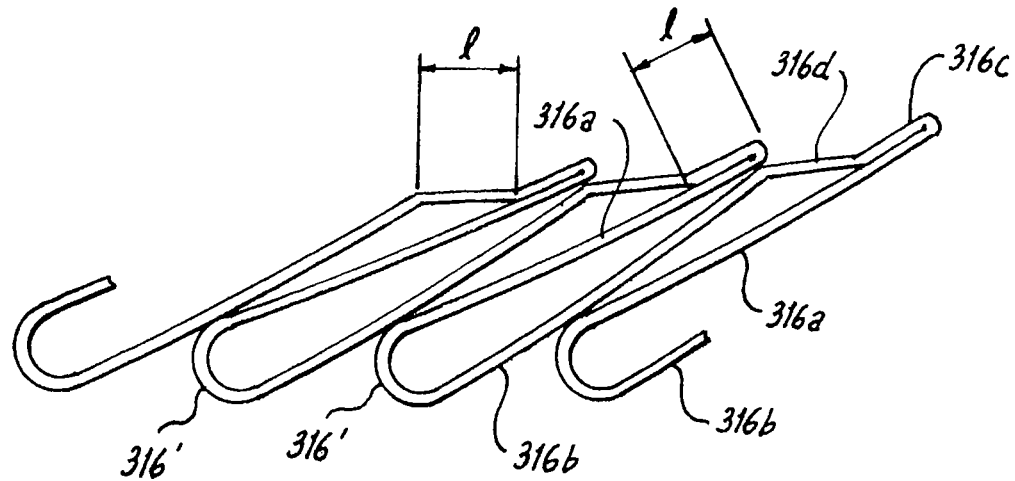
FIG. 15 is a top plan view of the circumferential pleats shown in FIG. 14.

When the circumferential pleats of the subject disclosure are formed, the two medial pleat segments 316*c* and 316*d* are splayed out, collapsed or otherwise flattened by moving in the direction indicated by arrow "x". The pleats 316 are then moved into an overlapped condition. In this condition, which is shown in FIGS. 14 and 15, the two medial pleat segments 316*c* and 316*d* become part of the second leg 316*b* of a preceding pleat 316. By way of example, if the height of each pleat leg 316*a*, 316*b* is 1.0 inch, and the length of each medial pleat segment 316*c*, 316*d* is 0.25 inches, the resulting circumferential pleats 316' will have a radially inner pleat leg with an arc length of 1.0 inch and a radially outer pleat leg with an arc length of 1.50 inches.

It is envisioned that the W-shaped configuration of pleat formation 300 can be employed to maintain adjacent pleat surfaces of the filter sleeves in spaced apart relationship, so that they do not contact one another over the majority of the axial length of the filter sleeves, and thus there is less restriction to flow through the sleeves. In this instance, surface-to-surface pleat contact would mainly occur at the opposed ends of the two filter sleeves, where the sleeves are sealed or otherwise affixed to the end caps. Alternatively, it is envisioned that the circumferential pleats formed by the W-shaped composite, could be secured in place using spot welds or a similar technique, so that the medial pleats are maintained in a flattened state.

Figure 16:
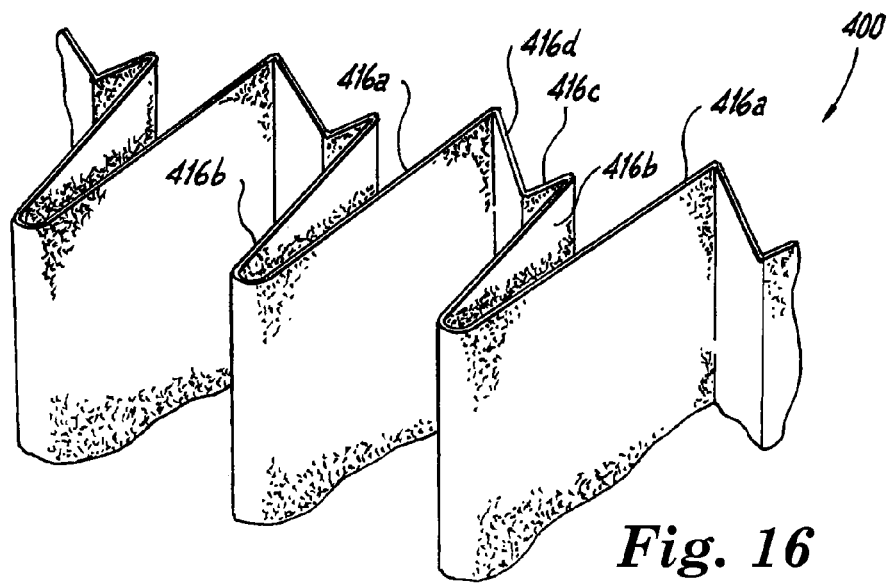
FIG. 16 is a perspective view of another pleat formation used to form the circumferential pleats of the subject disclosure, that includes upstanding pleats having first and second pleat legs of different height, wherein the first pleat leg of one pleat is joined to the second pleat leg of a preceding pleat by a medial pleat section including two medial pleat segments of different length.
Figure 17:
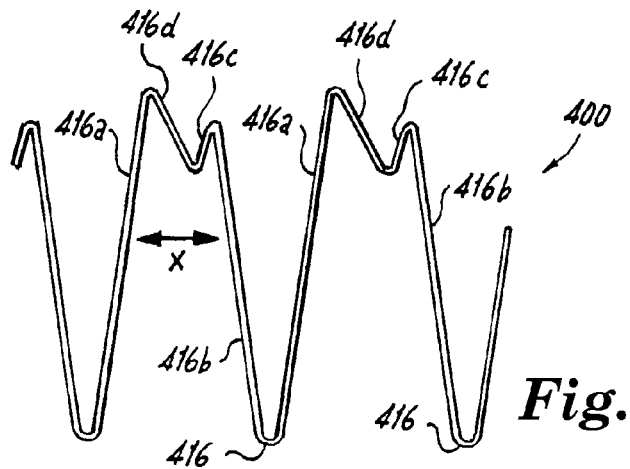
FIG. 17 is a top plan view of the pleat formation shown in FIG. 16.

Referring to FIGS. 16 and 17, there is illustrated another pleat formation designated by reference numeral 400, which is used to form the circumferential pleats of the inner and outer filter sleeves of the filter assembly of the subject disclosure. Pleat formation 400 includes upstanding pleats 416, each having first and second pleat legs 416*a* and 416*b*. In pleat formation 400, the first pleat leg 416*a* of each pleat 416 is longer than the second pleat leg 416*b* of each pleat 416. In addition, the first pleat leg 416*a* of one pleat 416 is joined to the second pleat leg 416*b* of a preceding pleat 416 by a medial pleat section that includes two medial pleat segments 416*c* and 416*d* of different length. Preferably, the length of the leading medial pleat segment 416*c* is less than the length of the trailing medial pleat segment 416*d*.

Figure 18:
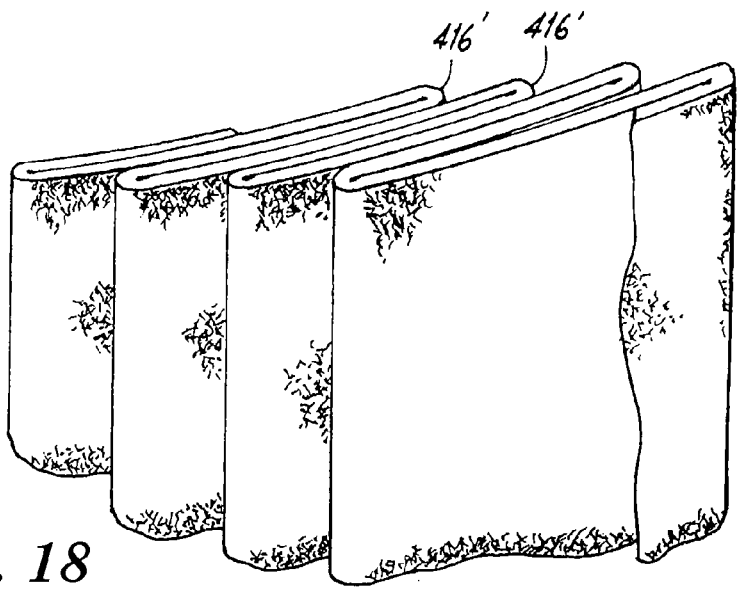
FIG. 18 is a perspective view of the circumferential pleats formed by moving the pleat formation of FIGS. 16 and 17 into an overlapped condition, wherein the two medial pleat segments of different length are flattened to become part of the second leg of a preceding pleat.

The medial pleats segments 416*c*, 416*d* are asymmetric and thus a preferential collapse zone is defined along the length of the longer trailing segment 416*d*. When the circumferential pleats 416' are formed, the two medial pleat segments 416*c* and 416*d* are collapsed or otherwise flattened out by moving in the direction indicated by arrow "x" to become part of the second leg 416*b* of a preceding pleat 416', as shown in FIG. 18.

Figure 19:
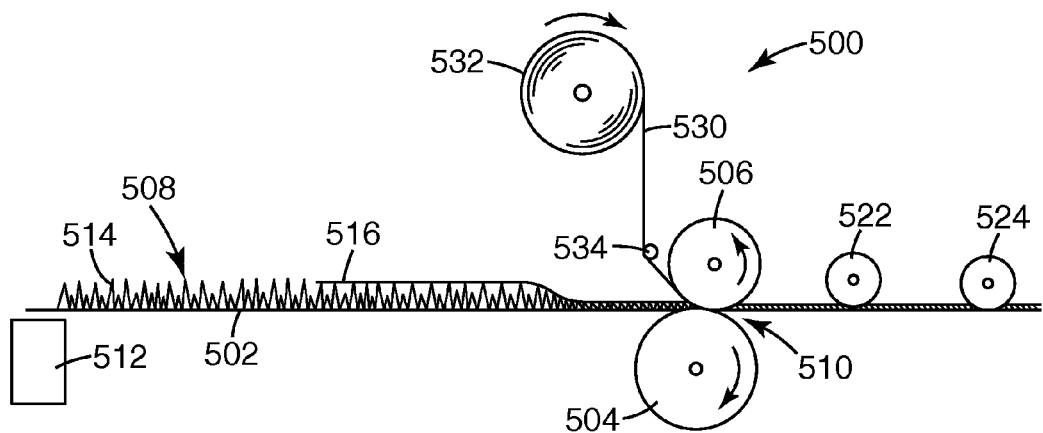
FIG. 19 is a schematic view of an apparatus constructed in accordance with the subject disclosure for fabricating pleat packs used in the formation of the circumferentially pleated filter sleeves of the subject invention.

Those skilled in the art will readily appreciate that the circumferentially pleated bag-type filter assembly disclosed herein can be employed in a variety of filtration applications commonly supported by such filters. It is also envisioned however, that the circumferentially pleated bag-type filters disclosed herein could be employed in high flow filtration applications commonly supported by stacked 10 inch cartridge filters or by large diameter pleated filter such as the Pall Ultipleat® High Flow filter Referring now to FIG. 19, there is illustrated an apparatus for fabricating pleat packs used in the formation of the circumferentially pleated filter sleeves 12, 14 of the subject invention, which is designated generally by reference numeral 500. In brief, apparatus 500 is adapted for use in conjunction with a pleater, which delivers or otherwise feeds a continuous pack of upstanding pleats of a particular pleat formation to the apparatus 500 along a horizontal contact surface. Apparatus 500 is configured to guide the pleats received from the pleater into a flattened condition, secure the pleats in the flattened condition, and then cross-cut the pleats into packs of predetermined length for subsequent formation into sleeves of circumferential pleats.

Apparatus 500 includes a generally horizontal contact plane or surface 502 along which the upstanding pleats 514 formed from a multi-layered composite filter media 508 are conducted or otherwise conveyed from the pleater or pleating machine 512. Apparatus 500 further includes a pair of opposing rollers 504, 506 for moving the upstanding pleats along contact surface 502. In one embodiment of the apparatus, the contact surface 502 is a stationary surface. In another embodiment of the apparatus, the contact surface 502 is a moving surface, such as a conveyor belt. The relatively larger roller or drive roller 504 primarily serves to move the upstanding pleats in a downstream direction away from the pleater 512. The relatively smaller roller or nip roller 506 facilitates the downstream movement of the pleats as well. An adjustable compression gap 510 is provided between the two opposed rollers 504, 506 such that the filter media 508 of the upstanding pleats 514 passing therebetween is advantageously compressed, as described in more detail below with respect to FIG. 21.

Figure 20A:
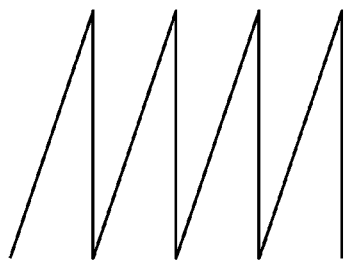
FIGS. 20a-20e illustrate a plurality of different pleat formations for use in conjunction with forming the circumferential pleats of the subject invention.
Figure 20B:
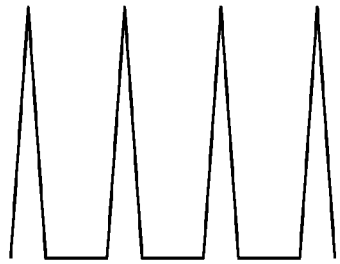
Figure 20C:
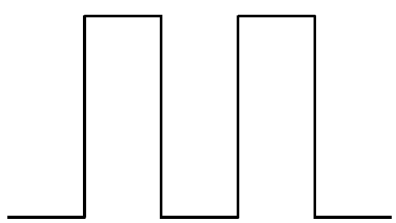
Figure 20D:
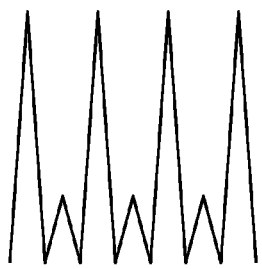
Figure 20E:
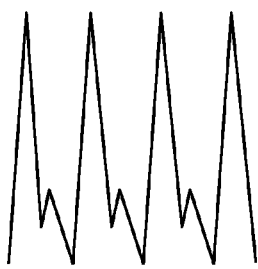

A preferred pleater 512 has vertical knives (not shown) capable of programmable operation by a CNC machine. As a result, the pleater 512 can form a variety of pleat styles by simple reprogramming of the sequence and heights to which the knives extend. For example, to create standard radial pleats, where each pleat leg is the same length, the knife pleater need only received new coordinates of travel for the bottom and top knife. For standard straight pleats these coordinates are identical in magnitude. Other preferable pleat styles or forms include a saw tooth pleat form wherein each pleat has a vertical pleat leg and an adjoining angled pleat leg (FIG. 20*a*), a flat bottom pleat wherein adjacent pleats having legs of equal length are joined by a flat pleat section (FIG. 20*b*), a square pleat wherein each pleat has a pair of legs joined by a bridge section (FIG. 20*c*), a symmetric W pleat form (FIG. 20*d*), and an asymmetric W pleat form (FIG. 20*e*). In the non-limiting exemplary description set forth herein, the upstanding pleats 514 are illustrated as asymmetric W-shaped pleats.

Referring again to FIG. 19, apparatus 500 further includes a guide bar 516 which is adapted and configured to move the upstanding pleat 514 into a flattened condition as the filter media 508 is pulled or otherwise conveyed along the horizontal contact plane 502 by or in conjunction with the action of the opposed rollers 504, 506. In this embodiment of the apparatus, guide bar 516 extends substantially parallel to the contact plane 502. The upstanding pleats 514 move continuously to take advantage of the friction and compressive forces exerted by passing the filter media 508 beneath and under the guide bar 516.

Figure 21:
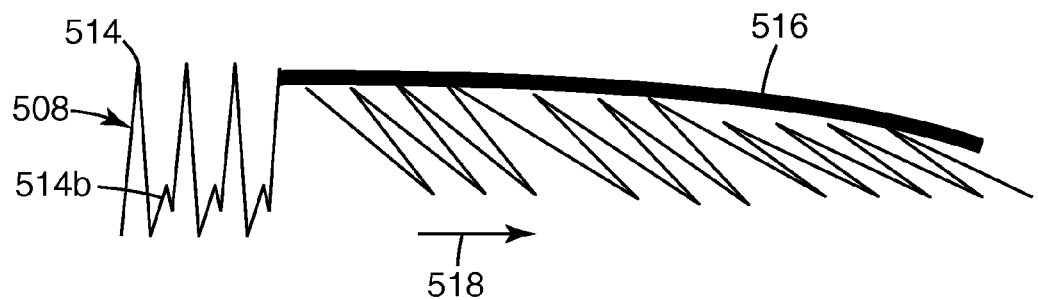
FIG. 21 is a schematic view of a pleat flattening device that includes a guide bar with a decreasing clearance for use in conjunction with the apparatus of FIG. 19.

Referring to FIG. 21, guide bar 516 may be configured in such a manner so that it forms a decreasing gap with respect to the horizontal contact surface 502. As the upstanding pleats 514 move past the guide bar 516 in the direction of arrow 518, there is a natural affinity, due to friction caused by the guide bar 516, for the pleats to lean backwards in the opposite direction of arrow 518, promoting the flattening process.

Figure 22:
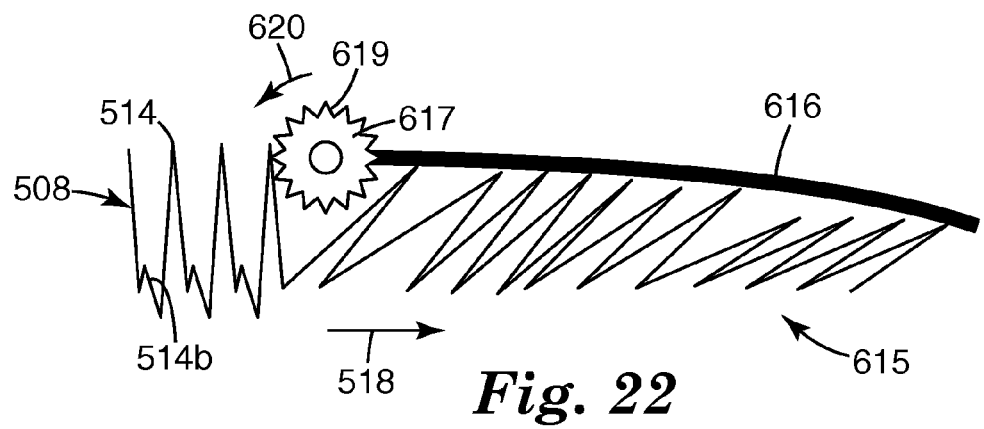
FIG. 22 is a schematic view of a pleat flattening device that includes a guide bar with a decreasing clearance and a rotating tool for use in conjunction with the apparatus of FIG. 19.

Referring to FIG. 22, there is illustrated an alternative configuration of the guide bar assembly of apparatus 500 which includes, in addition to a guide bar 616 of decreasing gap, a rotating pinion tool 617. Tool 617 is adapted and configured to urge or otherwise push the upstanding pleats 514 in a forward direction such that the pleats 514 lean forward, rather than backward, as the pleats 514 move along the guide bar 616. Preferably, the rotating tool 617 includes notches 619 which are dimensioned and configured to capture the crowns of the upstanding pleats 514. The friction between the guide bar 616 and pleats 514 is partially exerted as a compression force along the pleats 514. As a result, the contact between the medial pleats 514*b* and the contact plane 502 is increased and, in turn, the drive capability of a moving contact plane 502 is increased.

Figure 23:
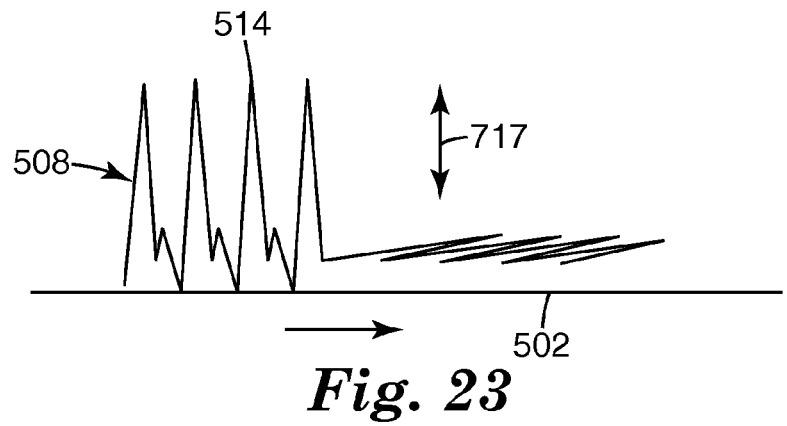
FIG. 23 is a schematic view of a linearly acting individual pleat flattening device for use in conjunction with the apparatus of FIG. 19.

Referring now to FIG. 23, there is illustrated another mechanism for flattening the upstanding pleats 514, which is designated generally by reference numeral 717. Flattening mechanism 717 is adapted and configured to reciprocate or otherwise move in a linear path, in a direction substantially perpendicular to the contact surface 502. Mechanism 717 is dimensioned and configured to flatten a single pleat 514 during each up-down cycle of movement. It is envisioned that mechanism 717 may be a rectangular structure attached to the end of a pneumatic cylinder, solenoid, cam actuated piston, rod or shaft.

Figure 24:
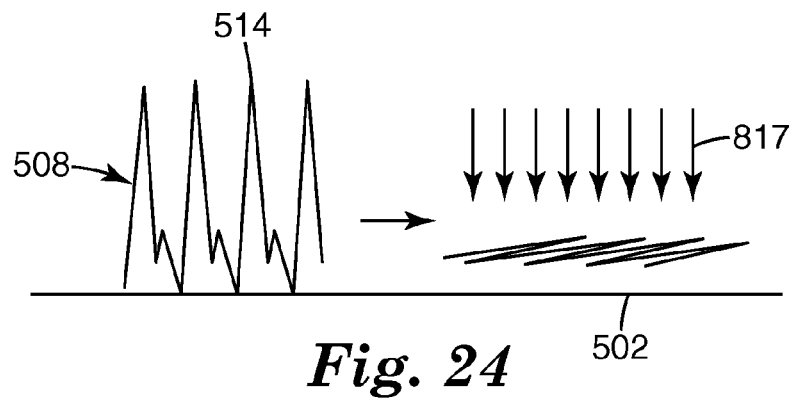
FIG. 24 is a schematic view of a linearly acting plural pleat flattening device for use in conjunction with the apparatus of FIG. 19.

Referring to FIG. 24, there is illustrated another pleat flattening mechanism designated generally by reference numeral 817. Mechanism 817 is similar to mechanism 717, except that it is adapted and configured to flatten a plurality of upstanding pleats 514 during each cycle of the mechanism 817.

Figure 25:
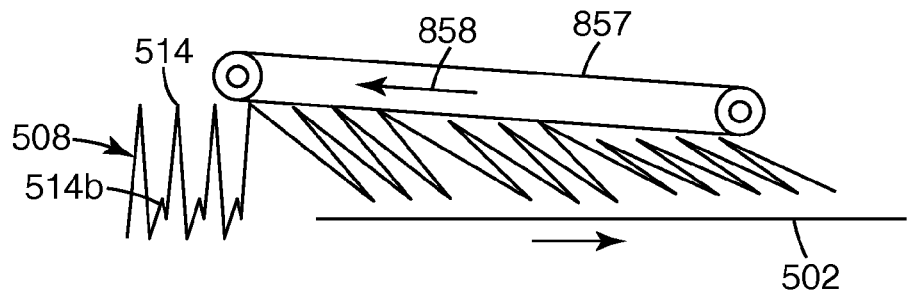
FIG. 25 is a schematic view of pleat flattening device that includes a moving continuous belt with a decreasing clearance, wherein the belt moves in a direction opposite to the direction of movement of the horizontal contact plane of the pleats, for use in conjunction with the apparatus of FIG. 19.

Referring to FIG. 25, there is illustrated another pleat flattening mechanism which includes a continuously moving drive belt 857. Drive belt 857 forms a secondary contact plane that can move at the same or at a different velocity than horizontal contact plane 502. Drive belt 857 forms a decreasing gap with respect to contact plane 502 to facilitate pleat flattening. Preferably, drive belt 857 can be configured to move in the same direction or in an opposite direction as a moving contact plane 502. To perform backward pleat flattening, drive belt 857 travels in the direction of indicator arrow 858, which is generally opposite to the direction of movement of contact plane 502. Belt 857 thus advantageously exerts compressive forces on the pleats 514 to encourage the medial pleats 514*b* to engage the contact plane 502 and drive the pleats 514 along the contact plane 502.

Figure 26:
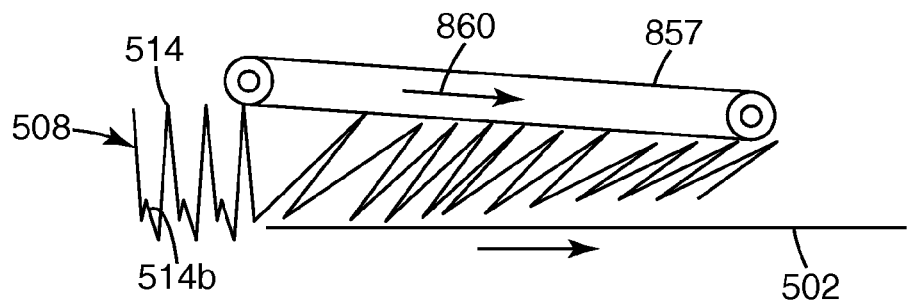
FIG. 26 is a schematic view of pleat flattening device that includes a moving continuous belt with a decreasing clearance, wherein the belt moves in the same direction as the direction of movement of the horizontal contact plane of the pleats, for use in conjunction with the apparatus of FIG. 19.

Referring to FIG. 26, drive belt mechanism 857 is shown moving in the direction indicated by arrow 860, which is substantially the same direction in which the horizontal contact plane 502 translates. Consequently, pleats 514 are flattened in a forward leaning direction. Here, belt mechanism 857 exerts compressive forces along the pleats 514, allowing the medial pleat sections 514*b* to engage the contact plane 502. Additionally, the motion of belt mechanism 857 assists in driving the filter media 508 through the apparatus 500.

Referring again to FIG. 19, once the upstanding pleats 514 are flattened, the upstanding pleats 514 pass through opposed rollers 504, 506 for compression and further flattening, as described above with reference to gap 510. Preferably, at such a time, a spunbonded polypropylene fiber fabric 530 such as TYPAR® is added to one or both sides of the filter media 508. The fabric 530 is stored on a roller 532 and fed into the gap 510 between rollers 504, 506, past a tensioning roller 534, which prevents puckering. Thereafter, the flattened and compressed pleats 514, pass through one or more sonic weld wheels 522, or a similar sonic device which function to fasten the compressed filter media 508 in the flattened condition. The sonic weld wheel(s) 522 are preferably located on opposite sides of the filter media 508 but only one is shown for simplicity. Preferably, each sonic weld wheel 522 forms a series of spot welds along the edges of the flattened pleats. It is also envisioned that the pleats can be secured in a flattened condition by way of a continuous tack weld such as that imposed by a thermal weld wheel.

Figure 27:
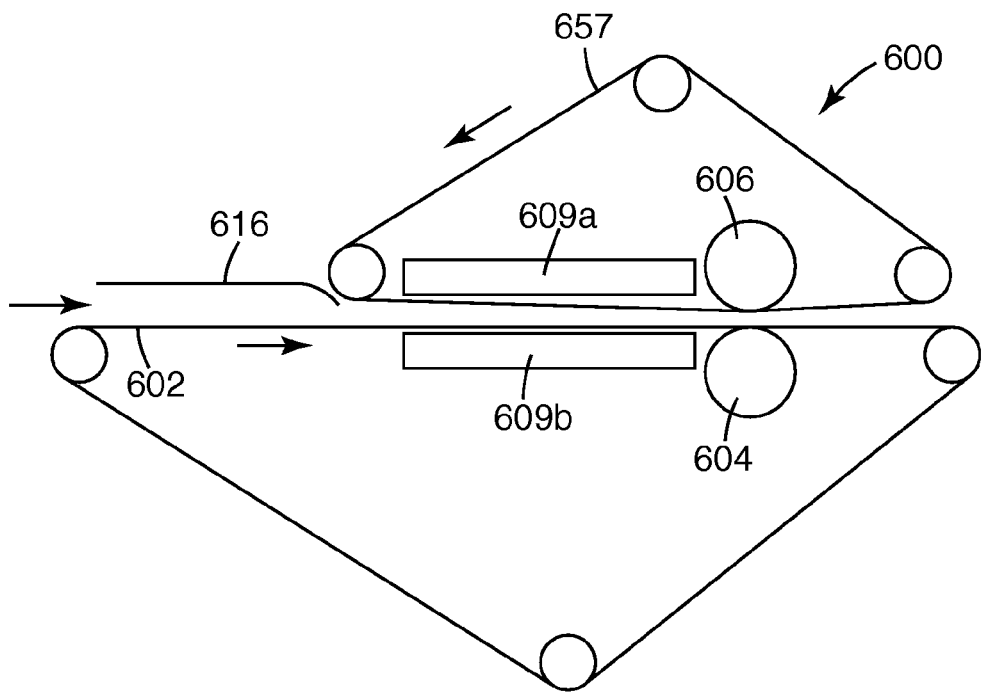
FIG. 27 is a schematic view of another apparatus configured in accordance with the subject disclosure for fabricating pleat packs used in the formation of the circumferentially pleated filter sleeves of the subject invention.

Turning to FIG. 27, there is illustrated another apparatus for flattening pleats in accordance with a preferred embodiment of the present disclosure which is designated generally by the reference numeral 600. Apparatus 600 includes a fold down plate or guide bar 616 with a decreasing gap and a moving secondary contact plane or belt drive mechanism 657. The belt drive mechanism 657 helps to move the upstanding pleats into a flattened condition as the upstanding pleats leave the downstream end of the guide bar 616. Apparatus 600 further includes a pair of opposed heater coils 609*a*, 609*b*. Heater coil 609*a* is located adjacent drive belt 657 and heater coil 609*b* is located adjacent drive belt 602, which defines the horizontal plane along which the flattened pleats travel. Heater coils 609*a*, 609*b* apply heat and pressure along the flattened pleats to provide further compression and consolidation thereto. It is also envisioned that the heater coils 609*a*, 609*b* function to fasten or otherwise laminate the pleats in the flattened condition.

In one embodiment, low melt point netting is included as part of the filter media from which pleats are formed. As the flattened pleats travel through the heater coils 609*a*, 609*b* of apparatus 600, the low melt point netting melts in a controlled manner to form a weld between the netting layers of coincident or adjacent pleats. In another embodiment, a low melt point thermoplastic flux is provided in the filter media 508 to act as a cohesive interface between coincident pleats when they are exposed to the heat and pressure within apparatus 600. In yet another embodiment, the filter media from which pleats are formed includes at least one laminate. Preferably, the laminate is a low melt thermoplastic tape laminated to one side of the flattened pleats to help maintain pleat flatness. The laminate may also be used on both sides of the filter media and may be selected from such materials as low melt non-woven media, extruded netting, and perforated films. The addition of laminates also aids in product performance by decreasing friction with the filter basket during insertion and extraction, and if using a non-woven or woven laminate, it adds prefiltration efficiency and increasing filter life to the device.

In using the apparatus and methods described herein, filter media is fixed into flattened pleats in which the amount of pleat overlap is properly set and maintained. The resulting flattened pleat packs are solidly constructed to endure the rigors of handling and storage. The pleat packs may be stored in the flattened condition, thereby requiring less space than traditional rectangular or cylindrical pleat pack configurations and being less susceptible to damage than non-flattened pleat packs.

Referring again to FIG. 19, after the flattened and secured pleats pass through the sonic weld wheels 522 of apparatus 500, a slitter 524 cross-cuts the filter media 508 to form pleat packs of predetermined length and width. The slitter 524 may have rotating blades, compression blades, thermal knives, ultrasonic cutters, lasers or the like. It is envisioned that the cross-cutting operation performed by slitter 524 occurs at different stages of the pleat formation process, including before the pleats are flattened and secured.

The technique required to form filter sleeves from the flattened pleats 514 is generally dependent upon when the filter media 508 is cross-cut. For example, if the slitter 524 is located immediately downstream from the pleater 512, then the cross-cut is made prior to flattening the filter media 508. In such an instance, the pleats are flattened and secured with a free pleat leg at each end that can be connecting or otherwise joined to one another to form a filter sleeve of circumferential pleats, as shown in FIGS. 28a-28c. Preferably, the two free pleat legs are seamed together by thermal welding, impulse welding, ultrasonic welding or the like.

The filter sleeve 550 shown in FIG. 28c has a substantially uniform thickness throughout its circumference. As a result, there is uniform clearance when exerting or extracting the sleeve from a filter basket. Further, there is a constant thickness for improved welding during final assembly.

Figure 30A:
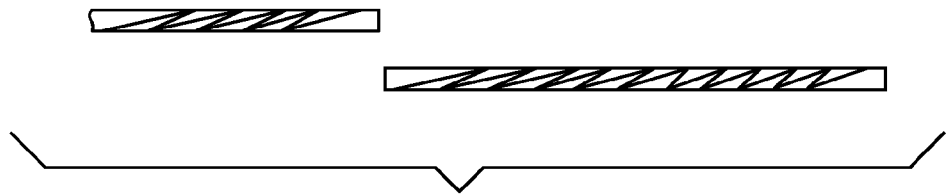
FIGS. 30a-30c are a set of illustrations depicting the manner in which the pleats packs of the subject invention are manually rolled into a fixture for thermal sonic welding to form into a sleeve.
Figure 30B:
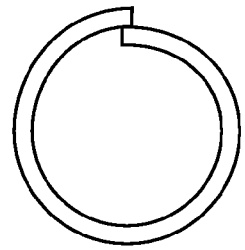
Figure 30C:
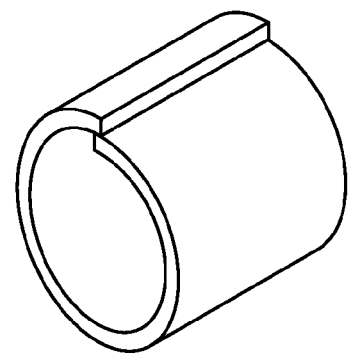

Referring again to FIG. 19, preferably the slitter 524 is disposed downstream from the pleat flattening section of apparatus 500. Accordingly, during a cross-cutting operation, it is likely that the slitter 524 will cut through the center of the pleats and, thus, some overlap will be needed to form a completed filter sleeve. Preferably, automatic machinery is used to create the overlap and form the sleeves in a continuous or semi-continuous fashion as shown schematically in FIGS. 29a-29b. Automatic machinery tends to form sleeves with consistent dimensions. In another embodiment, the sleeves are manually formed as shown schematically in FIGS. 30a-30c.

Figure 31:
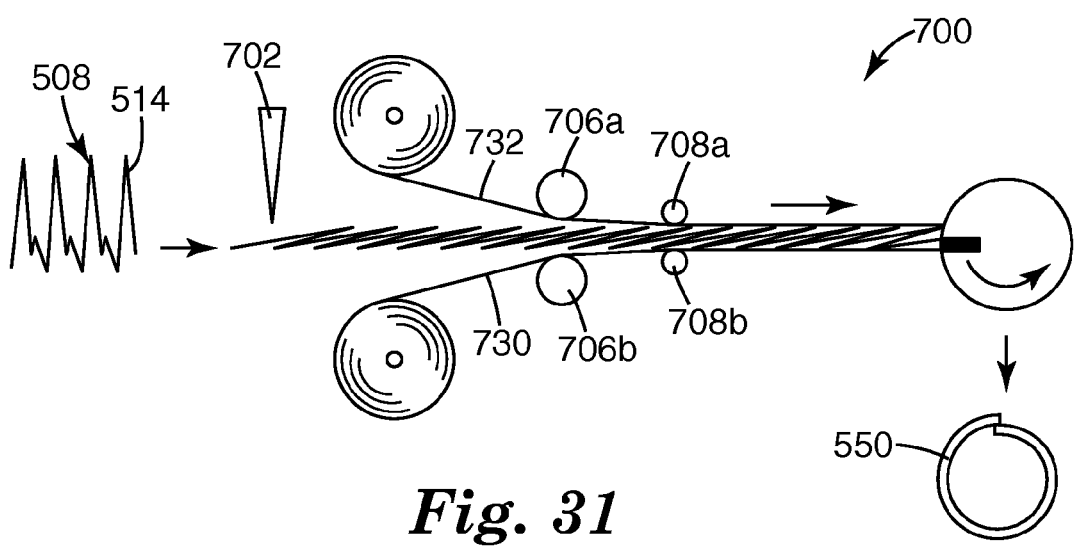
FIG. 31 yet another apparatus configured in accordance with the subject disclosure for fabricating pleat packs used in the formation of the circumferentially pleated filter sleeves of the subject invention.

Turning to FIG. 31, there is illustrated another apparatus constructed in accordance with the subject disclosure which is designated generally by the reference numeral 700. Apparatus 700 includes a tack welder 702 configured to secure the upstanding pleats 514 in a flattened condition. Thereafter, the flattened pleats 514 are fed between opposed laminating rollers 706a, 706b, where laminates support of rolls 732 are combined therewith. The laminated flattened pleats are then fed between opposed calendaring rollers 708a, 708b, which form the laminated pleats into an integral composite structure. Thereafter, the pleats may be cross-cut and formed into a cylindrical sleeve. In another embodiment, taping means may be used to permanently secure the pleat pack in a flattened position. In still another representative embodiment, the flattened pleated media remains uncut and is wound onto a take-up roll for long-term storage and subsequent use.

Although the apparatus and methods of the subject disclosure have been described with respect to several presently preferred embodiments, those skilled in the art will readily appreciate that modifications or changes may be made thereto without departing from the spirit and scope of the present disclosure.

What is claimed is:

1. A method for fabricating pleat packs used in the formation of circumferentially pleated filter sleeves, the method comprising the acts of:
    positioning a pleating machine proximate a substantially horizontal contact surface;
    delivering continuous upstanding pleat packs of a predetermined pleat formation from the pleating machine to the horizontal contact surface, the predetermined pleat formation comprising adjoining upstanding pleats each comprising a first pleat leg and a second pleat leg, wherein the first pleat leg of each upstanding pleat does not overlap the second pleat leg of an adjoining upstanding pleat;
    guiding the continuous upstanding pleat packs received from the pleating machine into a flattened condition on the substantially horizontal contact surface;
    securing the pleat packs in the flattened condition; and
    after securing, forming the flattened pleat packs into a predetermined length for subsequent formation into sleeves of circumferential pleats.

2. The method of claim 1 further comprising the act of:
    positioning structure proximal the substantially horizontal contact surface, for moving the upstanding pleats from the pleating machine to the substantially horizontal contact surface.

3. The method of claim 1 wherein the substantially horizontal contact surface is a stationary contact surface.

4. The method of claim 1 wherein the substantially horizontal contact surface is a moving contact surface.

5. The method of claim 1 further comprising the act of:
    passing the flattened pleat packs between a pair of opposing rollers positioned proximal the substantially horizontal contact surface.

6. The method of claim 5 further comprising the act of:
    compressing the flattened pleats in an adjustable compression gap positioned between the pair of opposed rollers.

7. The method of claim 1 wherein the predetermined pleat formation is selected from the group consisting of standard straight pleats, saw tooth pleats, flat bottom pleats, square pleats, symmetric W pleats, and asymmetric W pleats.

8. The method of claim 1 wherein the pleating machine comprises a CNC machine programmable to deliver continuous upstanding pleat packs of more than one predetermined pleat formation.

9. The method of claim 1 further comprising the act of:
    continuously laminating the flattened pleats with at least one laminate;
    calendaring the laminated pleats to convert the laminated pleats into an integral composite structure.

* * * * *